United States Patent
Zhang et al.

(10) Patent No.: US 10,305,558 B2
(45) Date of Patent: May 28, 2019

(54) PRECODING MATRIX INDICATOR FEEDBACK METHOD, RECEIVING METHOD, AND APPARATUS

(71) Applicant: HUAWEI TECHNOLOGIES CO., LTD., Shenzhen (CN)

(72) Inventors: Leiming Zhang, Beijing (CN); Qiang Wu, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/274,240

(22) Filed: Sep. 23, 2016

(65) Prior Publication Data

US 2017/0012684 A1    Jan. 12, 2017

Related U.S. Application Data

(63) Continuation of application No. PCT/CN2014/073958, filed on Mar. 24, 2014.

(51) Int. Cl.
*H04B 7/0456* (2017.01)
*H04B 7/06* (2006.01)
*H04W 88/02* (2009.01)

(52) U.S. Cl.
CPC ......... *H04B 7/0478* (2013.01); *H04B 7/0456* (2013.01); *H04B 7/063* (2013.01);
(Continued)

(58) Field of Classification Search
CPC .................................................... H04B 7/0478
(Continued)

(56) References Cited

U.S. PATENT DOCUMENTS 8,179,775 B2 * 5/2012 Chen ............... H04L 1/0029
370/203
2012/0039369 A1 2/2012 Choi et al.
(Continued)

FOREIGN PATENT DOCUMENTS

CN 102291222 A 12/2011
CN 103229578 7/2013
(Continued)

OTHER PUBLICATIONS

Extended European Search Report dated Mar. 29, 2017, in corresponding European Patent Application No. 14887128.8.
(Continued)

*Primary Examiner* — Lihong Yu
(74) *Attorney, Agent, or Firm* — Staas & Halsey LLP

(57) ABSTRACT

Embodiments of the present invention disclose a precoding matrix indicator feedback method, receiving method, and apparatus. User equipment UE receives a reference signal sent by a base station; the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, and each second subband of M second subbands corresponds to a first PMI; and the UE feeds back the first PMI corresponding to each second subband to the base station, and feeds back the second PMI corresponding to each first subband to the base station.

21 Claims, 4 Drawing Sheets

(52) U.S. Cl.
CPC ........... *H04B 7/065* (2013.01); *H04B 7/0617* (2013.01); *H04B 7/0639* (2013.01); *H04W 88/02* (2013.01)

(58) Field of Classification Search
USPC .......................................................... 375/267
See application file for complete search history.

(56) References Cited

U.S. PATENT DOCUMENTS

| | | |
|---|---|---|
| 2012/0039402 A1 | 2/2012 | Clerckx et al. |
| 2012/0063500 A1 | 3/2012 | Wang et al. |
| 2012/0106450 A1 | 5/2012 | Golitschek Edler Von Elbwart et al. |
| 2012/0113830 A1 | 5/2012 | Zhu et al. |
| 2013/0100888 A1 | 4/2013 | Shimezawa et al. |
| 2013/0163461 A1 | 6/2013 | Kim et al. |
| 2013/0267222 A1* | 10/2013 | Park ................... H04B 7/0619 455/422.1 |

FOREIGN PATENT DOCUMENTS

| | | |
|---|---|---|
| CN | 103444115 A | 12/2013 |
| JP | 2012520643 | 9/2012 |
| JP | 2013533653 | 8/2013 |
| WO | WO2011158762 | 12/2011 |

OTHER PUBLICATIONS

International Search Report dated Dec. 31, 2014 in corresponding International Patent Application No. PCT/CN2014/073958.
Written Opinion of the International Search Authority dated Dec. 31, 2014 in corresponding International Patent Application No. PCT/CN2014/073958.
International Search Report dated Dec. 31, 2014 in corresponding International Application No. PCT/CN2014/073958.
Notice of Reasons for Rejection, dated Dec. 5, 2017, in Japanese Application No. 2016558632 (7 pp).
Office Action, dated Feb. 24, 2018, in Chinese Application No. 201480001645.5 (8 pp.).

* cited by examiner

PRECODING MATRIX INDICATOR FEEDBACK METHOD, RECEIVING METHOD, AND APPARATUS

CROSS-REFERENCE TO RELATED APPLICATIONS

This application is a continuation of International Application No. PCT/CN2014/073958, filed on Mar. 24, 2014, the disclosure of which is hereby incorporated by reference in its entirety.

TECHNICAL FIELD

The present invention relates to the field of wireless communications, and in particular, to a precoding matrix indicator feedback method, receiving method, and apparatus.

BACKGROUND

A codebook based precoding method is that a codebook (that is, a set of precoding matrixes) is stored in advance at a receive end and a transmit end, and the receive end selects a best precoding matrix by a criterion according to a current channel status, and feeds back a precoding matrix indicator (PMI for short) to the transmit end. Due to a small feedback amount and a relatively good compatibility, the method is widely applied to the field of wireless communications.

Each precoding matrix in a codebook used by a conventional 3GPP LTE R10 system for 8 antennas may be denoted as $W=W_1W_2$, where $W_1$ is used to represent a broadband/long-term channel characteristic and is denoted by a first PMI, and $W_2$ is used to represent a subband/short-term channel characteristic and is denoted by a second PMI, where when ranks are 1 and 2, $W_1$ is formed by 4 columns of contiguous beam vectors, and a spacing between neighboring beam vectors is $$e^{j\frac{2\pi}{32}},$$

and therefore, in an 8Tx double-codebook, a beam phase change covered by $W_1$ is in a range of $$\frac{2\pi}{32} \cdot 4 = \frac{\pi}{4},$$

and in a scenario in which the beam phase change is relatively large, $W_1$ cannot cover a beam phase change of an entire bandwidth, and consequently, a system performance loss is relatively large.

Further, a double-codebook structure is also likewise used by a codebook of a conventional 3GPP LTE R12 system for 4 antennas whose ranks are 1 and 2, and each precoding matrix in the codebook may be denoted as $W=W_1W_2$, where $W_1$ is formed by 4 columns of large-spacing beam vectors, and a spacing between neighboring beam vectors is $$e^{j\frac{2\pi S}{32}},$$

where $W_1$ completely covers a beam change range of 0~2π, but a minimum granularity between neighboring beams is $$\frac{\pi}{2},$$

and consequently, a beam quantization granularity is relatively poor, and likewise, a system performance loss is relatively large.

To sum up, in the prior art, in a scenario in which a beam phase change is relatively large, $W_1$ cannot cover a beam phase change of an entire bandwidth, while in a scenario in which the beam phase change is relatively small, a beam quantization granularity is relatively poor, both of which cause system performance degradation, and consequently, a codebook in the prior art does not match a beam phase scenario, degrading system performance.

SUMMARY

Embodiments of this application provide a precoding matrix indicator feedback method, receiving method, and apparatus, so that a codebook is matched with a scenario in which a beam phase changes, thereby improving system performance.

According to a first aspect of the present invention, user equipment (UE for short) is provided, where the UE includes:

a receiving unit, configured to receive a reference signal sent by a base station;

a matrix selection unit, configured to receive the reference signal sent by the receiving unit, and select, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2; and a sending unit, configured to: after the matrix selection unit selects the precoding matrix for each first subband, feed back the first PMI corresponding to each second subband to the base station, and feed back the second PMI corresponding to each first subband to the base station.

With reference to the first aspect, in a first possible implementation manner, the N first subbands are all subbands or some subbands on a carrier in the system transmission bandwidth.

With reference to the first aspect, in a second possible implementation manner, the UE further includes a first reporting unit, configured to: when the matrix selection unit selects, based on the reference signal, the precoding matrix for each first subband of the N first subbands in the system transmission bandwidth from the codebook, report a value of M to the base station.

With reference to the first aspect, in a third possible implementation manner, the UE further includes a first M value determining unit, configured to report a pre-selected value of M to the base station, and receive a value of M fed back by the base station, where the value of M is determined by the base station based on the pre-selected value of M.

With reference to the first aspect, in a fourth possible implementation manner, a value of M and/or a quantity of first subbands included in each second subband of the M second subbands is configured by the base station.

With reference to the first aspect, in a fifth possible implementation manner, the UE further includes a second reporting unit, configured to: when the matrix selection unit selects, based on the reference signal, the precoding matrix for each first subband of the N first subbands in the system transmission bandwidth from the codebook, report a quantity of first subbands included in each second subband of the M second subbands to the base station.

With reference to the first aspect, in a sixth possible implementation manner, a value of M and/or a quantity of first subbands included in each second subband of the M second subbands is predefined.

With reference to the first aspect, in a seventh possible implementation manner, the UE further includes a second M value determining unit, configured to determine, based on the reference signal, a channel estimation, and then determine a value of M according to the channel estimation and the codebook, where a capacity gain between a system capacity obtained when the M second subbands are selected and a system capacity obtained when M−1 second subbands are selected is greater than a threshold.

With reference to the first aspect or any one of the first to seventh possible implementation manners, in an eighth possible implementation manner, there are at least two second subbands corresponding to different first PMIs in the M second subbands.

With reference to the first aspect or any one of the first to eighth possible implementation manners, in a ninth possible implementation manner, the first subbands included in each second subband of the M second subbands are contiguous in frequency or non-contiguous in frequency.

With reference to the first aspect or any one of the first to ninth possible implementation manners, in a tenth possible implementation manner, each precoding matrix in the codebook may be denoted as $$W=W_1 \cdot W_2$$

where $W_1$ is denoted by the first PMI, and $W_2$ is denoted by the second PMI.

With reference to the first aspect or any one of the first to tenth possible implementation manners, in an eleventh possible implementation manner, there are at least two UEs corresponding to different values of M.

With reference to the first aspect or any one of the first to eleventh possible implementation manners, in a twelfth possible implementation manner, all second subbands of M second subbands corresponding to at least two UEs include different quantities of first subbands.

According to a second aspect of the present invention, a base station is provided, where the base station includes:

a sending unit, configured to send a reference signal to UE; and a receiving unit, configured to receive a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and selects a corresponding precoding matrix from the codebook according to the first PMI corresponding to each second subband and the second PMI corresponding to each first subband.

With reference to the second aspect, in a first possible implementation manner, the N first subbands are all subbands or some subbands on a carrier in the system transmission bandwidth.

With reference to the second aspect, in a second possible implementation manner, the receiving unit is further configured to: after the base station sends the reference signal to the UE, receive a value of M reported by the UE.

With reference to the second aspect, in a third possible implementation manner, the receiving unit is further configured to receive a pre-selected value of M reported by the UE; and the base station further includes an M value determining unit, configured to receive the pre-selected value of M sent by the receiving unit, and determine a value of M according to the pre-selected value of M.

With reference to the second aspect, in a fourth possible implementation manner, a value of M and/or a quantity of first subbands included in each second subband of the M second subbands is configured by the base station.

With reference to the second aspect, in a fifth possible implementation manner, the receiving unit is further configured to: after the base station sends the reference signal to the UE, receive a quantity of first subbands included in each second subband of the M second subbands, where the quantity is reported by the UE.

With reference to the second aspect, in a sixth possible implementation manner, a value of M and/or a quantity of first subbands included in each second subband of the M second subbands is predefined.

With reference to the second aspect or any one of the first to sixth possible implementation manners, in a seventh possible implementation manner, there are at least two second subbands corresponding to different first PMIs in the M second subbands.

With reference to the second aspect or any one of the first to seventh possible implementation manners, in an eighth possible implementation manner, the first subbands included in each second subband of the M second subbands are contiguous in frequency or non-contiguous in frequency.

With reference to the second aspect or any one of the first to eighth possible implementation manners, in a ninth possible implementation manner, each precoding matrix in the codebook may be denoted as $$W=W_1 \cdot W_2$$

where $W_1$ is denoted by the first PMI, and $W_2$ is denoted by the second PMI.

With reference to the second aspect or any one of the first to ninth possible implementation manners, in a tenth possible implementation manner, there are at least two UEs corresponding to different values of M.

With reference to the second aspect or any one of the first to tenth possible implementation manners, in an eleventh possible implementation manner, all second subbands of M second subbands corresponding to at least two UEs include different quantities of first subbands.

According to a third aspect of the present invention, a precoding matrix indicator feedback method is provided, where the method includes:

receiving, by user equipment UE, a reference signal sent by a base station;

selecting, by the UE based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2; and feeding back, by the UE, the first PMI corresponding to each second subband to the base station, and feeding back the second PMI corresponding to each first subband to the base station.

With reference to the third aspect, in a first possible implementation manner, the N first subbands are all subbands or some subbands on a carrier in the system transmission bandwidth.

With reference to the third aspect, in a second possible implementation manner, during the selecting, by the UE based on the reference signal, a precoding matrix for each first subband of N first subbands in a system transmission bandwidth from a codebook, the method further includes: reporting, by the UE, a value of M to the base station.

With reference to the third aspect, in a third possible implementation manner, a step of determining a value of M specifically includes: reporting, by the UE, a pre-selected value of M to the base station; and receiving, by the UE, the value of M fed back by the base station, where the value of M is determined by the base station based on the pre-selected value of M.

With reference to the third aspect, in a fourth possible implementation manner, a value of M and/or a quantity of first subbands included in each second subband of the M second subbands is configured by the base station.

With reference to the third aspect, in a fifth possible implementation manner, during the selecting, by the UE based on the reference signal, a precoding matrix for each first subband of N first subbands in a system transmission bandwidth from a codebook, the method further includes: reporting, by the UE, a quantity of first subbands included in each second subband of the M second subbands to the base station.

With reference to the third aspect, in a sixth possible implementation manner, a value of M and/or a quantity of first subbands included in each second subband of the M second subbands is predefined.

With reference to the third aspect, in a seventh possible implementation manner, a step of determining a value of M specifically includes: determining, by the UE based on the reference signal, a channel estimation; and determining, by the UE, the value of M according to the channel estimation and the codebook, where a capacity gain between a system capacity obtained when the M second subbands are selected and a system capacity obtained when M−1 second subbands are selected is greater than a threshold.

With reference to the third aspect or any one of the first to seventh possible implementation manners, in an eighth possible implementation manner, there are at least two second subbands corresponding to different first PMIs in the M second subbands.

With reference to the third aspect or any one of the first to eighth possible implementation manners, in a ninth possible implementation manner, the first subbands included in each second subband of the M second subbands are contiguous in frequency or non-contiguous in frequency.

With reference to the third aspect or any one of the first to ninth possible implementation manners, in a tenth possible implementation manner, each precoding matrix in the codebook may be denoted as $$W = W_1 \cdot W_2$$

where $W_1$ is denoted by the first PMI, and $W_2$ is denoted by the second PMI.

With reference to the third aspect or any one of the first to tenth possible implementation manners, in an eleventh possible implementation manner, there are at least two UEs corresponding to different values of M.

With reference to the third aspect or any one of the first to eleventh possible implementation manners, in a twelfth possible implementation manner, all second subbands of M second subbands corresponding to at least two UEs include different quantities of first subbands.

According to a fourth aspect of the present invention, a precoding matrix indicator receiving method is provided, where the method includes:

sending, by a base station, a reference signal to UE; and receiving, by the base station, a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

With reference to the fourth aspect, in a first possible implementation manner, the N first subbands are all subbands or some subbands on a carrier in the system transmission bandwidth.

With reference to the fourth aspect, in a second possible implementation manner, after the sending, by a base station, a reference signal to UE, the method further includes: receiving, by the base station, a value of M reported by the UE.

With reference to the fourth aspect, in a third possible implementation manner, a step of determining a value of M specifically includes: receiving, by the base station, a pre-selected value of M reported by the UE; and determining, by the base station, the value of M according to the pre-selected value of M.

With reference to the fourth aspect, in a fourth possible implementation manner, a value of M and/or a quantity of first subbands included in each second subband of the M second subbands is configured by the base station.

With reference to the fourth aspect, in a fifth possible implementation manner, after the sending, by a base station, a reference signal to UE, the method further includes: receiving, by the base station, a quantity of first subbands included in each second subband of the M second subbands, where the quantity is reported by the UE.

With reference to the fourth aspect, in a sixth possible implementation manner, a value of M and/or a quantity of first subbands included in each second subband of the M second subbands is predefined.

With reference to the fourth aspect or any one of the first to sixth possible implementation manners, in a seventh possible implementation manner, there are at least two second subbands corresponding to different first PMIs in the M second subbands.

With reference to the fourth aspect or any one of the first to seventh possible implementation manners, in an eighth possible implementation manner, the first subbands included in each second subband of the M second subbands are contiguous in frequency or non-contiguous in frequency.

With reference to the fourth aspect or any one of the first to eighth possible implementation manners, in a ninth possible implementation manner, each precoding matrix in the codebook may be denoted as $$W = W_1 \cdot W_2$$

where $W_1$ is denoted by the first PMI, and $W_2$ is denoted by the second PMI.

With reference to the fourth aspect or any one of the first to ninth possible implementation manners, in a tenth possible implementation manner, there are at least two UEs corresponding to different values of M.

With reference to the fourth aspect or any one of the first to tenth possible implementation manners, in an eleventh possible implementation manner, all second subbands of M second subbands corresponding to at least two UEs include different quantities of first subbands.

According to a fifth aspect of the present invention, UE is provided, where the UE includes:

a receiver, configured to receive a reference signal sent by a base station;

a processor, configured to select, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, were each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2; and a transmitter, configured to feed back the first PMI corresponding to each second subband to the base station, and feed back the second PMI corresponding to each first subband to the base station.

With reference to the fifth aspect, in a first possible implementation manner, the N first subbands are all subbands or some subbands on a carrier in the system transmission bandwidth.

With reference to the fifth aspect, in a second possible implementation manner, the transmitter is configured to: when the processor selects, based on the reference signal, a precoding matrix for each first subband of the N first subbands in the system transmission bandwidth from the codebook, report a value of M to the base station.

With reference to the fifth aspect, in a third possible implementation manner, the transmitter is further configured to report a pre-selected value of M to the base station; and the receiver is further configured to receive the value of M fed back by the base station, where the value of M is determined by the base station based on the pre-selected value of M.

With reference to the fifth aspect, in a fourth possible implementation manner, a value of M and/or a quantity of first subbands included in each second subband of the M second subbands is configured by the base station.

With reference to the fifth aspect, in a fifth possible implementation manner, the transmitter is configured to: when the processor selects, based on the reference signal, a precoding matrix for each first subband of the N first subbands in the system transmission bandwidth from the codebook, report a quantity of first subbands included in each second subband of the M second subbands to the base station.

With reference to the fifth aspect, in a sixth possible implementation manner, a value of M and/or a quantity of first subbands included in each second subband of the M second subbands is predefined.

With reference to the fifth aspect, in a seventh possible implementation manner, the processor is specifically configured to determine, based on the reference signal, a channel estimation, and determine a value of M according to the channel estimation and the codebook, where a capacity gain between a system capacity obtained when the M second subbands are selected and a system capacity obtained when M−1 second subbands are selected is greater than a threshold.

With reference to the fifth aspect or any one of the first to seventh possible implementation manners, in an eighth possible implementation manner, there are at least two second subbands corresponding to different first PMIs in the M second subbands.

With reference to the fifth aspect or any one of the first to eighth possible implementation manners, in a ninth possible implementation manner, the first subbands included in each second subband of the M second subbands are contiguous in frequency or non-contiguous in frequency.

With reference to the fifth aspect or any one of the first to ninth possible implementation manners, in a tenth possible implementation manner, each precoding matrix in the codebook may be denoted as $$W = W_1 \cdot W_2$$

where $W_1$ is denoted by the first PMI, and $W_2$ is denoted by the second PMI.

With reference to the fifth aspect or any one of the first to tenth possible implementation manners, in an eleventh possible implementation manner, there are at least two UEs corresponding to different values of M.

With reference to the fifth aspect or any one of the first to eleventh possible implementation manners, in a twelfth possible implementation manner, all second subbands of M second subbands corresponding to at least two UEs include different quantities of first subbands.

According to a sixth aspect of the present invention, a base station is provided, where the base station includes:

a transmitter, configured to send a reference signal to UE; and a receiver, configured to receive a second PMI corresponding to each first subband of N first subbands and a first PMI corresponding to each second subband of M second subbands in a system transmission bandwidth that are fed back by the UE, where the M second subbands are determined from the N first subbands, and there is at least one second subband including at least two first subbands in the M second subbands, where both N and M are positive integers not less than 2;

a memory, configured to store a codebook, where the codebook includes at least two precoding matrixes; and a processor, configured to select a corresponding precoding matrix from the codebook according to the first PMI corresponding to each second subband and the second PMI corresponding to each first subband.

With reference to the sixth aspect, in a first possible implementation manner, the N first subbands are all subbands or some subbands on a carrier in the system transmission bandwidth.

With reference to the sixth aspect, in a second possible implementation manner, the receiver is further configured to: after the transmitter sends the reference signal to the UE, receive a value of M reported by the UE.

With reference to the sixth aspect, in a third possible implementation manner, the receiver is further configured to receive a pre-selected value of M reported by the UE; and the processor is further configured to determine the value of M according to the pre-selected value of M.

With reference to the sixth aspect, in a fourth possible implementation manner, a value of M and/or a quantity of first subbands included in each second subband of the M second subbands is configured by the base station.

With reference to the sixth aspect, in a fifth possible implementation manner, the receiver is further configured to: after the transmitter sends the reference signal to the UE, receive a quantity of first subbands included in each second subband of the M second subbands, where the quantity is reported by the UE.

With reference to the sixth aspect, in a sixth possible implementation manner, a value of M and/or a quantity of first subbands included in each second subband of the M second subbands is predefined.

With reference to the sixth aspect or any one of the first to sixth possible implementation manners, in a seventh possible implementation manner, there are at least two second subbands corresponding to different first PMIs in the M second subbands.

With reference to the sixth aspect or any one of the first to seventh possible implementation manners, in an eighth possible implementation manner, the first subbands included in each second subband of the M second subbands are contiguous in frequency or non-contiguous in frequency.

With reference to the sixth aspect or any one of the first to eighth possible implementation manners, in a ninth possible implementation manner, each precoding matrix in the codebook may be denoted as $$W = W_1 \cdot W_2$$

where $W_1$ is denoted by the first PMI, and $W_2$ is denoted by the second PMI.

With reference to the sixth aspect or any one of the first to ninth possible implementation manners, in a tenth possible implementation manner, there are at least two UEs corresponding to different values of M.

With reference to the sixth aspect or any one of the first to tenth possible implementation manners, in an eleventh possible implementation manner, all second subbands of M second subbands corresponding to at least two UEs include different quantities of first subbands.

Beneficial effects of the present invention are as follows:

In the embodiments of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and each first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

DESCRIPTION OF EMBODIMENTS

For a technical problem in the prior art that a codebook does not match a scenario of a beam phase, and system performance is low, in technical solutions put forward in embodiments of the present invention, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, and M is an integer not less than 2, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Main implementation principles, specific implementation manners and corresponding achievable beneficial effects of the technical solutions of the embodiments of the present invention are described in detail below with reference to accompanying drawings.

Embodiment 1

Figure 1:
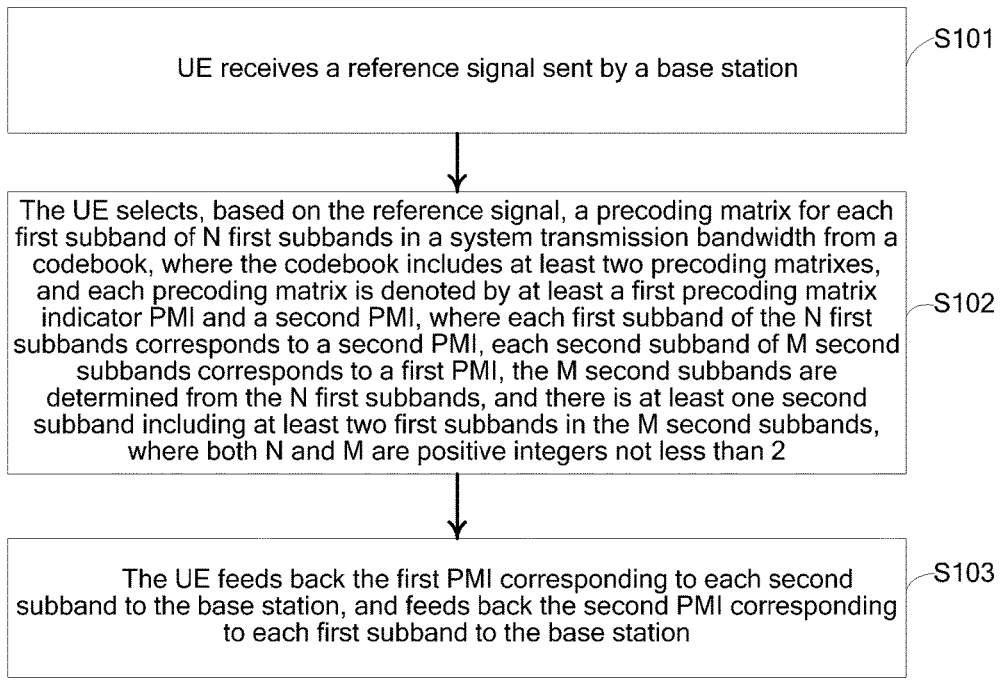
FIG. 1 is a flowchart of a precoding matrix indicator feedback method according to an embodiment of the present invention.

This embodiment of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a channel state information reference signal (CSI RS for short), a demodulation reference signal (demodulation RS, DM RS for short), a cell-specific reference signal (cell-specific RS, CRS for short) or the like.

Specifically, the base station may send, in a subframe, downlink control information to the UE by using a physical downlink control channel, so that the UE can receive the downlink control information, and acquire the reference signal according to the downlink control information. Certainly, the UE may further receive radio resource control protocol (RRC for short) signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

For example, when the system transmission bandwidth is 20 MHz, if N=4, the UE divides the system transmission bandwidth in the evenly equal division manner, 20 MHz is divided into four first subbands, and a bandwidth corresponding to each first subband is 5 MHz; or if the UE divides the system transmission bandwidth in the unequal division manner, 20 MHz is divided into four first subbands, where the four first subbands are, for example, the first first subband corresponding to a bandwidth being 4 MHz, the second first subband corresponding to a bandwidth being 6 MHz, the third first subband corresponding to a bandwidth being 3 MHz, and the fourth first subband corresponding to a bandwidth being 7 MHz.

For another example, when the system transmission bandwidth is 10 MHz, if 10 MHz is divided into five first subbands, and a bandwidth corresponding to each first subband is the same, the bandwidth corresponding to each first subband is 2 MHz, and when the UE receives the reference signal, a precoding matrix is selected for each first subband of the five first subbands from the codebook.

For example, when a quantity of transmit antennas at a base station end is 8, and a rank is 1, refer to Table 1 for details of the precoding matrix.

TABLE 1

| $i_1$ | $i_2$ | | | | |
|---|---|---|---|---|---|
| | 0 | 1 | 2 | 3 | 4 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ |

| $i_1$ | $i_2$ | | | | |
|---|---|---|---|---|---|
| | 5 | 6 | 7 | 8 | 9 |
| 0-15 | $W_{2i_1+1,1}^{(1)}$ | $W_{2i_1+1,2}^{(1)}$ | $W_{2i_1+1,3}^{(1)}$ | $W_{2i_1+2,0}^{(1)}$ | $W_{2i_1+2,1}^{(1)}$ |

| $i_1$ | $i_2$ | | | | |
|---|---|---|---|---|---|
| | 10 | 11 | 12 | 13 | 14 |
| 0-15 | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ |

| | $i_2$ |
|---|---|
| $i_1$ | 15 |
| 0-15 | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ $\varphi_n = e^{j\pi n/2}$ $v_m = [\,1 \quad e^{j2\pi m/32} \quad e^{j4\pi m/32} \quad e^{j6\pi m/32}\,]^T$, $i_1$ in Table 1 is used to denote a first PMI, and $i_2$ is used to denote a second PMI. After receiving the reference signal, the UE selects a first PMI for each second subband, where a value of the first PMI corresponds to $i_1$ in Table 1, and selects a second PMI for each first subband of first subbands corresponding to each second subband, where a value of the second PMI corresponds to $i_2$ in Table 1, where $i_1$ and $i_2$ are in a one-to-one correspondence with a precoding matrix. For example, if $i_1=0$ and $i_2=0$, a corresponding precoding matrix is $W_{0,0}^{(1)}$.

For another example, when a quantity of transmit antennas at a base station end is 4, and a rank is 1, refer to Table 2 for details of the precoding matrix.

TABLE 2

| $i_1$ | $i_2$ | | | | |
|---|---|---|---|---|---|
| | 0 | 1 | 2 | 3 | 4 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ |

| $i_1$ | $i_2$ | | | | |
|---|---|---|---|---|---|
| | 5 | 6 | 7 | 8 | 9 |
| 0-15 | $W_{i_1+8,10}^{(1)}$ | $W_{i_1+8,18}^{(1)}$ | $W_{i_1+8,26}^{(1)}$ | $W_{i_1+16,4}^{(1)}$ | $W_{i_1+16,12}^{(1)}$ |

| $i_1$ | $i_2$ | | | | |
|---|---|---|---|---|---|
| | 10 | 11 | 12 | 13 | 14 |
| 0-15 | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ |

| $i_1$ | $i_2$ |
|---|---|
| | 15 |
| 0-15 | $W_{i_1+24,30}^{(1)}$ | where $W_{m,n}^{(1)} = \frac{1}{2}\begin{bmatrix} v'_m \\ \varphi'_n v'_m \end{bmatrix}$ $\varphi'_n = e^{j2\pi n/32}$ $v'_m = [1 \quad e^{j2\pi m/32}]^T$, $i_1$ in Table 2 is used to denote a first PMI, and $i_2$ is used to denote a second PMI. After receiving the reference signal, the UE selects a first PMI for each second subband, where a value of the first PMI corresponds to $i_1$ in Table 2, and selects a second PMI for each first subband of first subbands corresponding to each second subband, where a value of the second PMI corresponds to $i_2$ in Table 1, where $i_1$ and $i_2$ are in a one-to-one correspondence with a precoding matrix.

It should be noted that, a quantity of and a rank of transmit antennas to which the present invention is applicable may be any positive integer.

Specifically, a criterion on which the UE selects a precoding matrix from Table 1 or Table 2 may be a channel capacity maximization criterion, a throughput maximization criterion, a chordal distance minimization criterion, or the like.

Specifically, each precoding matrix in the codebook may be denoted as $$W = W_1 \cdot W_2 \quad \text{formula (1)}$$

where $W_1$ is denoted by the first PMI, and $W_2$ is denoted by the second PMI.

Specifically, as an example, a vector matrix, of $W_1$ may be denoted as:

$$W_1(m) = \begin{bmatrix} X(m) & 0 \\ 0 & X(m) \end{bmatrix} \text{ and} \quad \text{formula (2)}$$

$$X(m) = \begin{bmatrix} 1 & 1 & & 1 \\ e^{j2\pi\frac{k+m_1}{N}} & e^{j2\pi\frac{k+m_2}{N}} & & e^{j2\pi\frac{2(k+m_P)}{N}} \\ e^{j2\pi\frac{2(k+m_1)}{N}} & e^{j2\pi\frac{2(k+m_2)}{N}} & \cdots & e^{j2\pi\frac{2(k+m_P)}{N}} \\ e^{j2\pi\frac{3(k+m_1)}{N}} & e^{j2\pi\frac{3(k+m_2)}{N}} & & e^{j2\pi\frac{3(k+m_P)}{N}} \end{bmatrix} \quad \text{formula (3)}$$

where N is power of 2, k is an integer, $\{m_1, m_2, \ldots, m_P\}$ is a non-negative integer, and P is a positive integer, used to represent P beam vectors included in $W_1$, such as four beam vectors included in each $W_1$ when P=4. When $\{m_1, m_2, \ldots, m_P\}$ are contiguous non-negative integers, corresponding P beam vectors are contiguous, or when $\{m_1, m_2, \ldots, m_P\}$ are non-contiguous non-negative integers, corresponding P beam vectors are non-contiguous.

Specifically, when a rank is 1, $W_2$ may be denoted as:

$$W_2 = \frac{1}{2}\begin{bmatrix} Y_1 \\ \varphi_n Y_2 \end{bmatrix} \quad \text{formula (4)}$$

where $$\varphi_n = e^{j\frac{2\pi n}{M}},$$

$n \in \{0, 1, \ldots, M-1\}$, where M is power of 2, for example, M=4, and $Y_1$, $Y_2$ are P×1-dimensional column selection vectors, for example, when P=4, $$Y_1, Y_2 \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}.$$

Further, each second subband individually corresponds to a first PMI, and each first PMI corresponds to a $W_1$, so that each second subband individually corresponds to a $W_1$. Therefore, a subband A corresponds to $W_1^1$, a subband B corresponds to $W_1^2$, a subband C corresponds to $W_1^3$, and a subband D corresponds to $W_1^4$, where all of A, B, C, and D are second subbands. Each $W_1$ includes P contiguous or non-contiguous beam vectors, so that each second subband has P contiguous or non-contiguous beam vectors. Therefore, quantization granularity precision of the beam vectors is improved.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

Specifically, when the M second subbands are determined from the N first subbands, the UE first determines a value of M, and then determines the M second subbands from the N first subbands according to the value of M, where when determining the value of M, the UE determines the value of M in a configuration manner of the UE. For example, after determining the value of M, the UE may divide the N first subbands into the M second subbands. Moreover, because at least one second subband including at least two first subbands exists, the value of M is less than a value of N.

Specifically, a step of determining, by the UE, a value of M specifically includes: determining, by the UE based on the reference signal, a channel estimation; and determining, by the UE, the value of M according to the channel estimation and the codebook, where a capacity gain between a system capacity obtained when the M second subbands are selected and a system capacity obtained when M−1 second subbands are selected is greater than a threshold. Certainly, it may further be that a gain between system performance obtained when the M second subbands are selected and system performance obtained when M−1 second subbands are selected is greater than a threshold, where the system performance includes a system capacity, a system throughput, systematic spectral efficiency or the like.

Specifically, when the UE determines a value of M according to the channel estimation and the codebook, the threshold is determined according to an actual situation, and the value of M is not greater than a quantity of precoding matrixes in the codebook. For example, if the quantity of the precoding matrixes is 5, the value of M is 5 maximally, and 2 minimally.

For example, a first system capacity obtained when the UE selects two second subbands is A, a second system capacity obtained when the UE selects three second subbands is B, and a third system capacity obtained when the UE selects four second subbands is C, where a first difference between the second system capacity and the first system capacity is B−A, and the first difference is a capacity gain between a capacity obtained when three second subbands are selected and a capacity obtained when two second subbands are selected; a second difference between the third system capacity and the second system capacity is C−B, and likewise, the second difference is a capacity gain between a capacity obtained when four second subbands are selected and a capacity obtained when three second subbands are selected. If the threshold is D, if (B−A)≥D, and if (C−B)<D, it may be determined that M is 3, or if (C−B)>D, whether a difference between a system capacity obtained when five second subbands are selected and the third system capacity obtained when four second subbands are selected is less than D continues to be acquired. If the difference is less than D, it may be determined that M is 4, if the difference is not less than D, until it is acquired that a difference between a system capacity obtained when K second subbands are selected and a system capacity obtained when K−1 second subbands are selected is less than D. If K−1 is less than the quantity of the precoding matrixes in the codebook, it may be determined that M is K−1, or if K−1 is not less than the quantity of the precoding matrixes in the codebook, the quantity of the precoding matrixes is used as the value of M.

In a specific implementation process, after determining the value of M, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Certainly, before determining the value of M in the configuration manner of the UE, the UE may determine a determining manner in which the M second subbands are determined from the N first subbands, where the determining manner is, for example, the continuous bandwidth division manner or the discontinuous bandwidth division manner; and while determining the value of M, the UE may further determine the determining manner in which the M second subbands are determined from the N first subbands, which is not specifically limited in this application.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Figure 2:
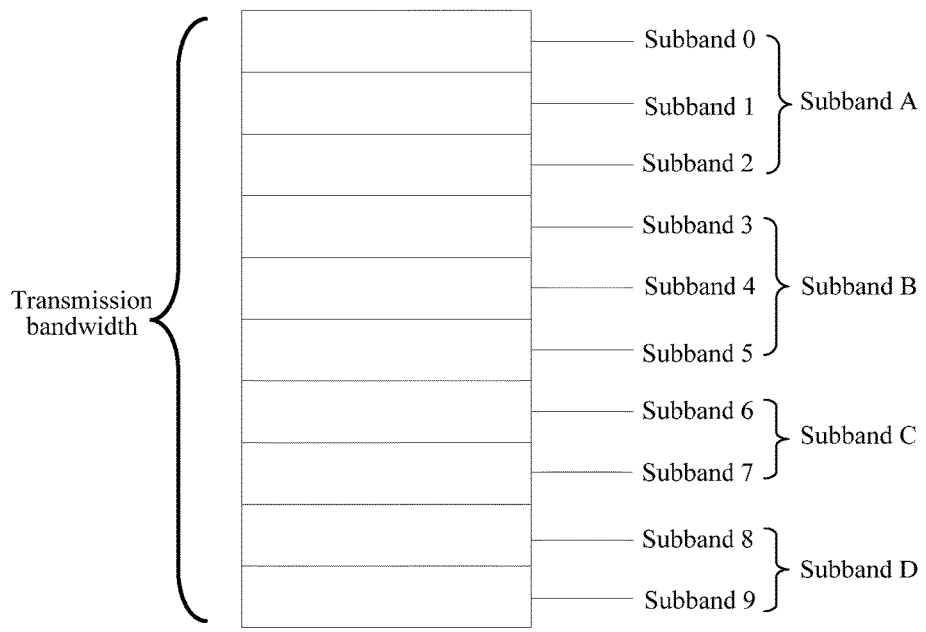
FIG. 2 is a first structural diagram of determining M second subbands from N first subbands according to an embodiment of the present invention.

For example, referring to FIG. 2, after the UE determines, according to the channel estimation and the codebook, that the value of M is 4, when the UE divides the N first subbands into M second subbands in the continuous bandwidth division manner, if the system transmission bandwidth is 10 MHz, and the N first subbands are a subband 0, a subband 1, a subband 2, a subband 3, a subband 4, a subband 5, a subband 6, a subband 7, a subband 8 and a subband 9, four second subbands are determined from the N first subbands. For example, the four second subbands are a subband A, a subband B, a subband C and a subband D, where the subband A includes the subband 0, the subband 1 and the subband 2, and because the subband A corresponds to the first first PMI, the subband 0, the subband 1 and the subband 2 all correspond to the first first PMI; the subband B includes the subband 3, the subband 4 and the subband 5, and because the subband B corresponds to the second first PMI, the subband 3, the subband 4 and the subband 5 all correspond to the second first PMI; the subband C includes the subband 6 and the subband 7, and because the subband C corresponds to the third first PMI, the subband 6 and the subband 7 both correspond to the third first PMI; and the subband D includes the subband 8 and the subband 9, and because the subband D corresponds to the fourth first PMI, the subband 8 and the subband 9 both correspond to the fourth first PMI, where bandwidths corresponding to each two neighboring first subbands included in each second subband of the subbands A, B, C and D are contiguous.

The subbands A, B, C and D are the four second subbands, and the subband 0, the subband 1, the subband 2, the subband 3, the subband 4, the subband 5, the subband 6, the subband 7, the subband 8 and the subband 9 are the N first subbands, so that the UE may determine a quantity of first subbands included in each second subband of the four second subbands.

Figure 3:
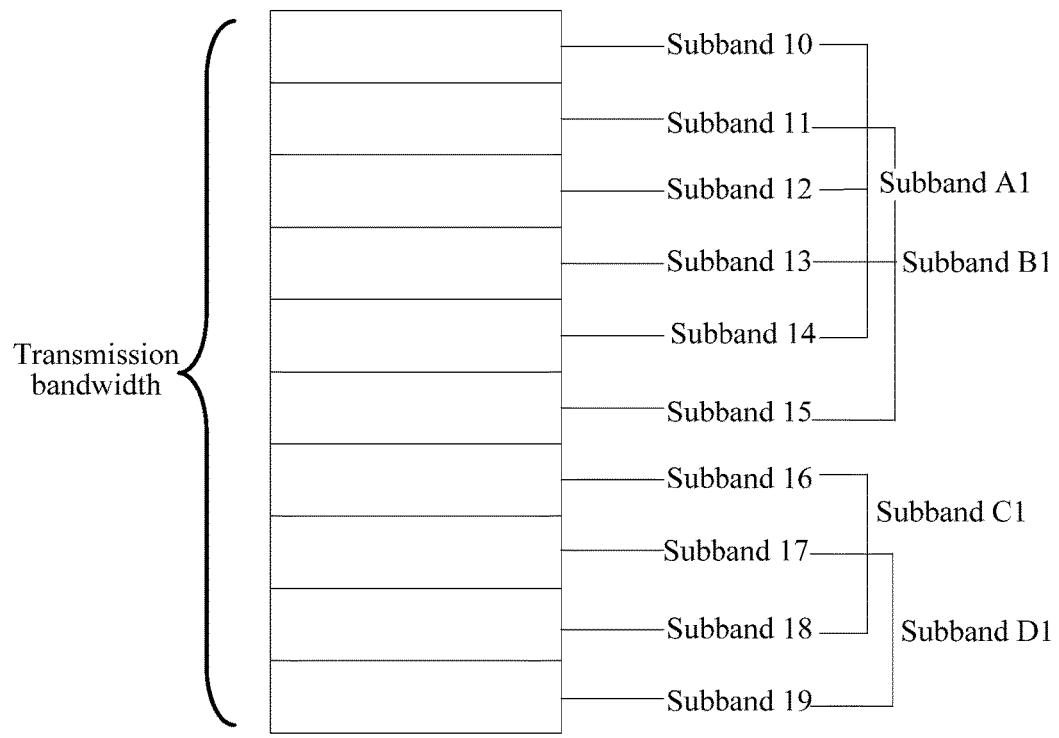
FIG. 3 is a second structural diagram of determining M second subbands from N first subbands according to an embodiment of the present invention.

For another example, referring to FIG. 3 and Table 1, after the UE determines, according to the channel estimation and the codebook, that the value of M is 4, when the UE divides the N first subbands into M second subbands in the discontinuous bandwidth division manner, if the system transmission bandwidth is 10 MHz, and the N first subbands are a subband 10, a subband 11, a subband 12, a subband 13, a subband 14, a subband 15, a subband 16, a subband 17, a subband 18 and a subband 19, the N first subbands are divided into four second subbands in the discontinuous bandwidth division manner, so that the four second subbands are a subband A1, a subband B1, a subband C1 and a subband D1, where the subband A1 includes the subband 10, the subband 12 and the subband 14, the subband B1 includes the subband 11, the subband 13 and the subband 15, the subband C1 includes the subband 16 and the subband 18, and the subband D1 includes the subband 17 and the subband 19, where bandwidths corresponding to each two neighboring first subbands included in each second subband of the subbands A1, B1, C1 and D1 are non-contiguous.

The subbands A1, B1, C1 and D1 are the four second subbands, and the subband 10, the subband 11, the subband 12, the subband 13, the subband 14, the subband 15, the subband 16, the subband 17, the subband 18 and the subband 19 are the N first subbands, so that the UE may determine a quantity of first subbands included in each second subband of the four second subbands.

Further, each second subband individually corresponds to a first PMI; and each first PMI corresponds to a $W_1$, so that each second subband individually corresponds to a $W_1$. Therefore, the subband A1 corresponds to $W_1^1$, the subband B1 corresponds to $W_1^2$, the subband C1 corresponds to $W_1^3$, and the subband D1 corresponds to $W_1^4$. Each $W_1$ includes P contiguous or non-contiguous beam vectors, so that each second subband has P contiguous or non-contiguous beam vectors. Therefore, quantization granularity precision of the beam vectors is improved.

Because the value of M is determined according to the channel estimation and the codebook, and when environments in which different UEs are located are different, corresponding channel characteristic parameters such as angular spread, a frequency correlation, and a spatial correlation are different, and/or the codebook differs, quantities of second subbands corresponding to different UEs may be the same or different, and values of M corresponding to at least two UEs may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

In a specific implementation process, during the selecting, by the UE based on the reference signal, a precoding matrix for each first subband of N first subbands in a system transmission bandwidth from a codebook, the method further includes: reporting, by the UE, a value of M to the base station.

Specifically, after the UE determines the value of M, the UE reports the value of M to the base station, so that the base station can receive the value of M, and determine the M second subbands from the N first subbands in a manner the same as that for the UE.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

For example, referring to FIG. 2 and Table 1, if a precoding matrix corresponding to the subband 0 is $W_{2\times4,1}^{(1)}$, a precoding matrix corresponding to the subband 1 is $W_{2\times4,2}^{(1)}$ and precoding matrix corresponding to the subband 2 is $W_{2\times4+2,1}^{(1)}$; a precoding matrix corresponding to the subband 3 is $W_{2\times7,3}^{(1)}$, a precoding matrix corresponding to the subband 4 is $W_{2\times7+1,1}^{(1)}$ and a precoding matrix corresponding to the subband 5 is $W_{2\times7+2,3}^{(1)}$; a precoding matrix corresponding to the subband 6 is $W_{2\times9,1}^{(1)}$ and a precoding matrix corresponding to the subband 7 is $W_{2\times9,3}^{(1)}$; and a precoding matrix corresponding to the subband 8 is $W_{2\times11,3}^{(1)}$ and a precoding matrix corresponding to the subband 9 is $W_{2\times11+2,2}^{(1)}$, it may be determined that $i_1$ corresponding to the subband 0, the subband 1 and the subband 2 is 4, that is, it is represented that the first PMI corresponding to the subband A is 4, that $i_1$ corresponding to the subband 3, the subband 4 and the subband 5 is 7, that is, it is represented that the first PMI corresponding to the subband B is 7, that $i_1$ corresponding to the subband 6 and the subband 7 is 9, that is, it is represented that the first PMI corresponding to the subband C is 9, and that $i_1$ corresponding to the subband 8 and the subband 9 is 11, that is, it is represented that the first PMI corresponding to the subband D is 11.

That the first PMI corresponding to the subband A is 4, that the first PMI corresponding to the subband B is 7, that the first PMI corresponding to the subband C is 9, and that the first PMI corresponding to the subband D is 11 are fed back, and that the second PMI corresponding to the subband 0 is 0, that the second PMI corresponding to the subband 1 is 2, that the second PMI corresponding to the subband 2 is 9, that the second PMI corresponding to the subband 3 is 3, that the second PMI corresponding to the subband 4 is 5, that the second PMI corresponding to the subband 5 is 11, that the second PMI corresponding to the subband 6 is 1, that the second PMI corresponding to the subband 7 is 3, that the second PMI corresponding to the subband 8 is 3, and that the second PMI corresponding to the subband 9 is 10 are further fed back.

In another embodiment, the UE may first determine the value of M and the first PMI corresponding to each second subband of the M second subbands according to a channel estimation and the codebook, then determine the second PMI corresponding to each first subband in the M second subbands, and then feed back the first PMI corresponding to each second subband and the second PMI corresponding to each first subband to the base station.

Specifically, when the UE may first determine the value of M and the first PMI corresponding to each second subband of the M second subbands according to a channel estimation and the codebook, the UE may first feed back the first PMI corresponding to each second subband, then determine the second PMI corresponding to each first subband in the M second subbands, and then feed back the second PMI corresponding to each first subband of the N first subbands to the base station.

For example, referring to FIG. 2, the UE determines, according to the channel estimation and the codebook, that the value of M is 4 and determines the first PMI corresponding to each second subband of the four second subbands. If the four second subbands are the subband A, the subband B, the subband C and the subband D, the UE determines, according to the channel estimation and the codebook, that the first PMI corresponding to the subband A is 4, the first PMI corresponding to the subband B is 7, the first PMI corresponding to the subband C is 9, and the first PMI corresponding to the subband D is 11. Then, the UE feeds back the second PMI corresponding to each second subband of the subband A, the subband B, the subband C and the subband D, and then determines that the second PMI corresponding to the subband 0 is 0, the second PMI corresponding to the subband 1 is 2 and the second PMI corresponding to the subband 2 is 9, where the subband 0, the subband 1 and the subband 2 are included in the subband A; the second PMI corresponding to the subband 3 is 3, the second PMI corresponding to the subband 4 is 5 and the second PMI corresponding to the subband 5 is 11, where the subband 3, the subband 4 and the subband 5 are included in the subband B; the second PMI corresponding to the subband 6 is 1 and the second PMI corresponding to the subband 7 is 3, where the subband 6 and the subband 7 are included in the subband C; and the second PMI corresponding to the subband 8 is 3 and the second PMI corresponding to the subband 9 is 10, where the subband 8 and the subband 9 are included in the subband D. Then, the UE feeds back the second PMI corresponding to each first subband of the subband 0 to the subband 9 to the base station.

Further, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a physical uplink control channel (PUCCH for short) or a physical uplink shared channel (PUSCH for short).

Specifically, a first PMI corresponds to a $W_1$, and the base station determines, according to that the quantity of the first PMIs fed back by the UE is M, that a quantity of $W_1$s is also M, and determines the M second subbands from the N first subbands in a manner the same as that for the UE, so that the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output (MIMO for short) wireless system.

In another embodiment, the UE sends a PMI to the base station, where the PMI may be a specific value, and in this case, the PMI directly indicates a precoding matrix. For example, if there are totally 256 different precoding matrixes, precoding matrixes whose mark numbers are 0, 1, . . . , and 255 may be indicated by using PMI=0, . . . , 255 respectively. When the PMI sent by the UE to the base station is 20, it is determined that the precoding matrix is a precoding matrix whose mark number is 20.

In an actual application process, the UE selects a precoding matrix for each first subband of N first subbands in a system transmission bandwidth from a codebook according to a received reference signal sent by the base station, feeds back a first PMI corresponding to each second subband to the base station, and feeds back a second PMI corresponding to each first subband to the base station, so that the base station can determine, based on a quantity of the received first PMIs, a value of M, then determine the M second subbands from the N first subbands according to the value of M in a manner the same as that for the UE, then acquire a precoding matrix corresponding to each first subband according to the first PMI and the second PMI that are fed back by the UE, and transmit data according to a coding scheme corresponding to the acquired precoding matrix corresponding to each first subband.

When the UE selects a precoding matrix for each first subband of N first subbands in a system transmission bandwidth from a codebook according to a received reference signal sent by the base station, the UE reports the value of M to the base station, so that before receiving the first PMI and the second PMI that are fed back by the UE, the base station may determine the M second subbands from the N first subbands according to the value of M in a manner the same as that for the UE. Therefore, when receiving the first PMI and the second PMI that are fed back by the UE, the base station can acquire a precoding matrix corresponding to each first subband more quickly, so that working efficiency is improved.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M first PMIs are in a one-to-one correspondence with M second subbands, so that each first PMI corresponds to a part in the system transmission bandwidth, and a bandwidth of each part in the system transmission bandwidth corresponds to a first PMI, and M is an integer not less than 2. Therefore, multiple first PMIs cover a beam phase change of the entire system transmission bandwidth, reducing a system performance loss; and because each first PMI corresponds to only one part in the system transmission bandwidth, quantization granularity precision of the beam vectors is improved.

Embodiment 2

Embodiment 2 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where when determining the value of M, the UE determines the value of M in a feedback manner of the UE. When the value of M is determined in the feedback manner of the UE, a step of determining the value of M specifically includes: reporting, by the UE, a pre-selected value of M to the base station; and receiving, by the UE, the value of M fed back by the base station, where the value of M is determined by the base station based on the pre-selected value of M.

Specifically, when the value of M is determined in the feedback manner of the UE, the UE selects the pre-selected value of M, and then reports the pre-selected value of M to the base station, and after receiving the pre-selected value of M, the base station determines the value of M according to the pre-selected value of M, and the base station feeds back the determined value of M to the UE, so that the UE can receive the value of M.

Specifically, when the base station determines the value of M according to the pre-selected value of M, the value of M may be the pre-selected value of M, or may be greater than or less than the pre-selected value of M, which is not specifically limited in this application. For example, if the pre-selected value of M received by the base station is 3, the value of M may be 3, or may be a value greater than 3, such as 4 or 5; or may further be a value less than 3, such as 2.

Figure 4:
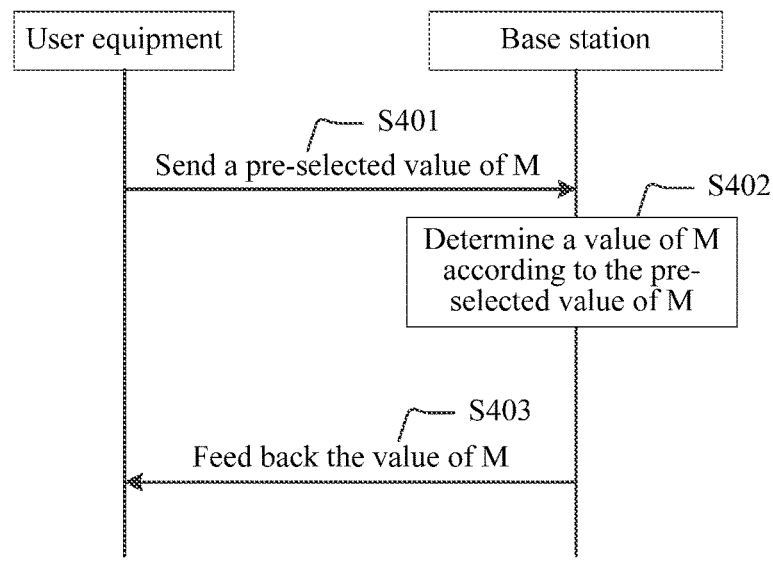
FIG. 4 is a structural diagram of interaction between user equipment and a base station according to an embodiment of this application.

For example, referring to FIG. 4, the user equipment first determines the pre-selected value of M, where the pre-selected value of M is, for example, an integer not less than 2 such as 2, 3, or 4, and then performs step S401 of sending the pre-selected value of M, so that the base station can receive the pre-selected value of M. After receiving the pre-selected value of M, the base station performs step S402 of determining the value of M according to the pre-selected value of M. After determining the value of M by means of step S402, the base station then performs step S403 of feeding back the value of M, so that the user equipment can receive the value of M fed back by the base station, and then determine, based on the value of M, the M second subbands from the N first subbands. For details, refer to the foregoing manner.

Likewise, after determining the value of M in the feedback manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Certainly, before determining the value of M in the feedback manner of the UE, the UE may determine a determining manner in which the M second subbands are determined from the N first subbands, where the determining manner is, for example, the continuous bandwidth division manner or the discontinuous bandwidth division manner; and like, while determining the value of M, the UE may further determine the determining manner in which the M second subbands are determined from the N first subbands, which is not specifically limited in this application.

For example, referring to FIG. 4 and FIG. 2, when the user equipment sends the pre-selected value of M such as 5 to the base station, the base station determines, based on the pre-selected value of M, that the value of M is 4, and then sends 4 to the user equipment. Therefore, the user equipment determines that the value of M is 4, then divides the N first subbands in the continuous bandwidth division manner, and determines four second subbands from a subband 0, a subband 1, a subband 2, a subband 3, a subband 4, a subband 5, a subband 6, a subband 7, a subband 8 and a subband 9. For example, the four second subbands are a subband A, a subband B, a subband C and a subband D, where the subband A includes the subband 0, the subband 1 and the subband 2, the subband B includes the subband 3, the subband 4 and the subband 5, the subband C includes the subband 6 and the subband 7, and the subband D includes the subband 8 and the subband 9, where frequencies corresponding to each two neighboring first subbands included in each second subband of the subbands A, B, C and D are contiguous.

The value of M is determined in the feedback manner of the UE, environments in which different UEs are located are different, and corresponding channel characteristic parameters such as angular spread, a frequency correlation, and a spatial correlation are different, so that selected pre-selected values of M may be the same or different. Therefore, when the base station determines the value of M according to the pre-selected value of M, the value of M may be the pre-selected value of M, or may be greater than or less than the pre-selected value of M, so that values of M may be the same or different. Therefore, values of M corresponding to different UEs may be the same or different, and values of M corresponding to at least two UEs may also be the same or different.

For example, a pre-selected value of M selected by first UE is 4, and the base station determines, according to 4, that the value of M is 3; and a pre-selected value of M selected by second UE is also 4, and the base station determines, according to 4, that the value of M corresponding to the second UE may be 3 or may be 4, so that the values of M corresponding to the first UE and the second UE may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

For example, referring to FIG. 2 and Table 1, if a precoding matrix corresponding to the subband 0 is $W_{2\times4,1}^{(1)}$, a precoding matrix corresponding to the subband 1 is $W_{2\times4,2}^{(1)}$ and a precoding matrix corresponding to the subband 2 is $W_{2\times4+2,1}^{(1)}$; a precoding matrix corresponding to the subband 3 is $W_{2\times7,3}^{(1)}$, precoding matrix corresponding to the subband 4 is $W_{2\times7+1,1}^{(1)}$ and a precoding matrix corresponding to the subband 5 is $W_{3\times7+2,3}^{(1)}$; a precoding matrix corresponding to the subband 6 is $W_{2\times9,1}^{(1)}$ and a precoding matrix corresponding to the subband 7 is $W_{2\times9,3}^{(1)}$; and a precoding matrix corresponding to the subband 8 is $W_{2\times11,3}^{(1)}$ and a precoding matrix corresponding to the subband 9 is $W_{2\times11+2,2}^{(1)}$, it may be determined that $i_1$ corresponding to the subband 0, the subband 1 and the subband 2 is 4, that is, it is represented that the first PMI corresponding to the subband A is 4, that $i_1$ corresponding to the subband 3, the subband 4 and the subband 5 is 7, that is, it is represented that the first PMI corresponding to the subband B is 7, that $i_1$ corresponding to the subband 6 and the subband 7 is 9, that is, it is represented that the first PMI corresponding to the subband C is 9, and that $i_1$ corresponding to the subband 8 and the subband 9 is 11, that is, it is represented that the first PMI corresponding to the subband D is 11.

That the first PMI corresponding to the subband A is 4, that the first PMI corresponding to the subband B is 7, that the first PMI corresponding to the subband C is 9, and that the first PMI corresponding to the subband D is 11 are fed back, and that the second PMI corresponding to the subband 0 is 0, that the second PMI corresponding to the subband 1 is 2, that the second PMI corresponding to the subband 2 is 9, that the second PMI corresponding to the subband 3 is 3, that the second PMI corresponding to the subband 4 is 5, that the second PMI corresponding to the subband 5 is 11, that the second PMI corresponding to the subband 6 is 1, that the second PMI corresponding to the subband 7 is 3, that the second PMI corresponding to the subband 8 is 3, and that the second PMI corresponding to the subband 9 is 10 are further fed back.

Further, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a physical uplink control channel (PUCCH for short) or a physical uplink shared channel (PUSCH for short).

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output (MIMO for short) wireless system.

In another embodiment, the UE sends a PMI to the base station, where the PMI may be a specific value, and in this case, the PMI directly indicates a precoding matrix. For example, if there are totally 256 different precoding matrixes, precoding matrixes whose mark numbers are 0, 1, . . . , and 255 may be indicated by using PMI=0, . . . , 255 respectively. When the PMI sent by the UE to the base station is 20, it is determined that the precoding matrix is a precoding matrix whose mark number is 20.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M first PMIs are in a one-to-one correspondence with M second subbands, so that each first PMI corresponds to a part in the system transmission bandwidth, and a bandwidth of each part in the system transmission bandwidth corresponds to a first PMI, and M is an integer not less than 2. Therefore, multiple first PMIs cover a beam phase change of the entire system transmission bandwidth, reducing a system performance loss; and because each first PMI corresponds to only one part in the system transmission bandwidth, quantization granularity precision of the beam vectors is improved.

Embodiment 3

Embodiment 3 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where the value of M is configured by the base station, that is, it is represented that the value of M is determined in a configuration manner of the base station, and the base station sends the value of M determined in the configuration manner of the base station to the UE, so that the UE receives the value of M, and then determines the M second subbands from the N first subbands according to the value of M.

Specifically, when the value of M is determined in the configuration manner of the base station, the base station may directly set the value of M, or may determine the value of M according to the system transmission bandwidth. For example, the value of M set by the base station is, for example, a value such as 3, 4, or 5. Then, the base station sends the value of M to the UE, so that the UE receives the value of M, and then determines the M second subbands from the N first subbands according to the value of M.

Specifically, when the base station determines the value of M according to the system transmission bandwidth, for example, when the system transmission bandwidth is not greater than 10 MHz, the base station sets the value of M to a value such as 3, 4, or 5, or when the system transmission bandwidth is greater than 10 MHz, the base station sets the value of M to a value such as 4, 5, or 6. Then, the base station sends the value of M to the UE, so that the UE receives the value of M, and then determines the M second subbands from the N first subbands according to the value of M.

For example, if the system transmission bandwidth is 10 MHz, and the base station determines, according to the system transmission bandwidth, that the value of M is 4, the value of M is fed back to the UE, so that the UE receives the value of M fed back by the base station.

Likewise, after receiving the value of M configured by the base station, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Certainly, before receiving the value of M configured by the base station, the UE may determine a determining manner in which the M second subbands are determined from the N first subbands, where the determining manner is, for example, the continuous bandwidth division manner or the discontinuous bandwidth division manner; and while receiving the value of M, the UE may further determine the determining manner in which the M second subbands are determined from the N first subbands, which is not specifically limited in this application.

For example, referring to FIG. 2, if the system transmission bandwidth is 10 MHz, and the base station determines, according to the system transmission bandwidth, that the value of M is 4, the value of M is fed back to the UE, so that the UE receives the value of M fed back by the base station. Therefore, the UE determines that the value of M is 4, then divides the N first subbands in the discontinuous bandwidth division manner, and determines four second subbands from a subband 10, a subband 11, a subband 12, a subband 13, a subband 14, a subband 15, a subband 16, a subband 17, a subband 18 and a subband 19. For example, the four second subbands are a subband A1, a subband B1, a subband C1 and a subband D1, where the subband A1 includes the subband 10, the subband 12 and the subband 14, the subband B1 includes the subband 11, the subband 13 and the subband 15, the subband C1 includes the subband 16 and the subband 18, and the subband D1 includes the subband 17 and the subband 19, where frequencies corresponding to each two neighboring first subbands included in each second subband of the subbands A1, B1, C1 and D1 are non-contiguous.

Values of M are configured by the base station, environments in which different UEs are located are different, and corresponding channel characteristic parameters such as angular spread, a frequency correlation, and a spatial correlation are different, so that the values of M configured by the base station may be the same or different, and then it may be determined that values of M corresponding to different UEs may be the same or different, and values of M corresponding to at least two UEs may also be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output MIMO wireless system.

In another embodiment, the UE sends a PMI to the base station, where the PMI may be a specific value, and in this case, the PMI directly indicates a precoding matrix. For example, if there are totally 256 different precoding matrixes, precoding matrixes whose mark numbers are 0, 1, . . . , and 255 may be indicated by using PMI=0, . . . , 255 respectively. When the PMI sent by the UE to the base station is 20, it is determined that the precoding matrix is a precoding matrix whose mark number is 20.

In an actual application process, the UE selects a precoding matrix for each first subband of N first subbands in a system transmission bandwidth from a codebook according to a received reference signal sent by the base station, feeds back a first PMI corresponding to each second subband to the base station, and feeds back a second PMI corresponding to each first subband to the base station, so that the base station can determine, based on a quantity of the received first PMIs, a value of M, then determine the M second subbands from the N first subbands according to the value of M in a manner the same as that for the UE, then acquire a precoding matrix corresponding to each first subband according to the first PMI and the second PMI that are fed back by the UE, and transmit data according to a coding scheme corresponding to the acquired precoding matrix corresponding to each first subband.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M first PMIs are in a one-to-one correspondence with M second subbands, so that each first PMI corresponds to a part in the system transmission bandwidth, and a bandwidth of each part in the system transmission bandwidth corresponds to a first PMI, and M is an integer not less than 2. Therefore, multiple first PMIs cover a beam phase change of the entire system transmission bandwidth, reducing a system performance loss; and because each first PMI corresponds to only one part in the system transmission bandwidth, quantization granularity precision of the beam vectors is improved.

Embodiment 4

Embodiment 4 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

For example, referring to FIG. 2, when the system transmission bandwidth is 10 MHz, the predefinition manner is that a quantity of first subbands included in each second subband is the same, so that when the UE determines the value of M according to the predefinition manner, the value of M may be, for example, 2, or 5. If M=5, each second subband includes two first subbands. For example, the first second subband includes a subband 0 and a subband 1, the second second subband includes a subband 2 and a subband 3, the third second subband includes a subband 4 and a subband 5, the fourth second subband includes a subband 6 and a subband 7, and the fifth second subband includes a subband 8 and a subband 9.

Likewise, after determining the value of M in the predefinition manner, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Certainly, before determining the value of M in the predefinition manner, the UE may determine a determining manner in which the M second subbands are determined from the N first subbands, where the determining manner is, for example, the continuous bandwidth division manner or the discontinuous bandwidth division manner, and while determining the value of M in the predefinition manner, the UE may further determine the determining manner in which the M second subbands are determined from the N first subbands, which is not specifically limited in this application.

Values of M are determined in the predefinition manner, environments in which different UEs are located are different, and corresponding channel characteristic parameters such as angular spread, a frequency correlation, and a spatial correlation are different, so that the values of M that are determined in the predefinition manner may be the same or different, and then it may be determined that values of M corresponding to different UEs may be the same or different, and values of M corresponding to at least two UEs may also be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output MIMO wireless system.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M first PMIs are in a one-to-one correspondence with M second subbands, so that each first PMI corresponds to a part in the system transmission bandwidth, and a bandwidth of each part in the system transmission bandwidth corresponds to a first PMI, and M is an integer not less than 2. Therefore, multiple first PMIs cover a beam phase change of the entire system transmission bandwidth, reducing a system performance loss; and because each first PMI corresponds to only one part in the system transmission bandwidth, quantization granularity precision of the beam vectors is improved.

Embodiment 5

Embodiment 5 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a configuration manner of the UE.

Specifically, when the quantity of the first subbands included in each second subband is determined in the configuration manner of the UE, the UE may determine the quantity of the first subbands included in each second subband according to the N first subbands. For example, quantities of first subbands included in all second subbands of the M second subbands may be a same value, or quantities of first subbands included in all second subbands of the M second subbands may be different values or values some of which are the same.

Further, after determining the quantity of the first subbands included in each second subband in the configuration manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, when the UE determines the quantity of the first subbands included in each second subband of the M second subbands from a subband 0, a subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5. When the quantity of the first subbands included in each second subband is 2, if division is performed in the continuous bandwidth division manner, the N first subbands are divided into five second subbands, where the first second subband of the five second subbands includes the subband 0 and the subband 1, the second second subband includes the subband 2 and the subband 3, the third second subband includes the subband 4 and the subband 5, the fourth second subband includes the subband 6 and the subband 7, and the fifth second subband includes the subband 8 and the subband 9, where frequencies corresponding to two neighboring first subbands in each second subband are contiguous.

In this embodiment, when the quantity of the first subbands included in each second subbands is determined in the configuration manner of the UE, the quantity of the first subbands included in each second subband is determined according to the N first subbands, environments in which different UEs are located are different, and corresponding values of N may also be the same or different so that the quantity of the first subbands included in each second subband that is determined in the configuration manner of the UE may be the same or different. Then, it may be determined that quantities of first subbands included in all second subbands of M second subbands corresponding to different UEs may be the same or different, and all second subbands of M second subbands corresponding to at least two UEs include different quantities of first subbands.

In a specific implementation process, during the selecting, by the UE based on the reference signal, a precoding matrix for each first subband of N first subbands in a system transmission bandwidth from a codebook, the method further includes: reporting, by the UE, a quantity of first subbands included in each second subband of the M second subbands to the base station.

Specifically, after the UE determines the quantity of the first subbands included in each second subband, the UE reports the quantity of the first subbands included in each second subband to the base station, so that the base station can receive the quantity of the first subbands included in each second subband, and determine the M second subbands from the N first subbands in a manner the same as that for the UE.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and further, the technical solution of this embodiment of this application can be applied to a multiple-input multiple-output MIMO wireless system.

When the UE selects a precoding matrix for each first subband of the N first subbands in the system transmission bandwidth from the codebook according to the received reference signal sent by the base station, the UE may further report the quantity of the first subbands included in each second subband of the M second subbands to the base station, so that before receiving the first PMI and the second PMI that are fed back by the UE, the base station already determines the M second subbands from the N first subbands in a manner the same as that for the UE. Therefore, when receiving the first PMI and the second PMI that are fed back by the UE, the base station can acquire a precoding matrix corresponding to each first subband more quickly, so that working efficiency is improved.

In another embodiment, during the selecting, by the UE based on the reference signal, a precoding matrix for each first subband of N first subbands in a system transmission bandwidth from a codebook, the method further includes: reporting, by the UE, a quantity of first subbands included in each second subband of the M second subbands to the base station.

In a specific implementation process, when the base station does not acquire the quantity of the first subbands included in each second subband of the M second subbands, the UE may report the quantity of the first subbands included in each second subband of the M second subbands to the base station.

When the UE selects a precoding matrix for each first subband of N first subbands in a system transmission bandwidth from a codebook according to a received reference signal sent by the base station, the UE may further report the quantity of the first subbands included in each second subband of the M second subbands to the base station, so that before receiving the first PMI and the second PMI that are fed back by the UE, the base station already determines the M second subbands from the N first subbands in a manner the same as that for the UE. Therefore, when receiving the first PMI and the second PMI that are fed back by the UE, the base station can acquire a precoding matrix corresponding to each first subband more quickly, so that working efficiency is improved.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M first PMIs are in a one-to-one correspondence with M second subbands, so that each first PMI corresponds to a part in the system transmission bandwidth, and a bandwidth of each part in the system transmission bandwidth corresponds to a first PMI, and M is an integer not less than 2. Therefore, multiple first PMIs cover a beam phase change of the entire system transmission bandwidth, reducing a system performance loss; and because each first PMI corresponds to only one part in the system transmission bandwidth, quantization granularity precision of the beam vectors is improved.

Embodiment 6

Embodiment 6 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to as part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a feedback mummer of the UE.

Specifically, when the quantity of the first subbands included in each second subband of the M second subbands is determined in the feedback manner of the UE, the UE reports a pre-selected quantity of the first subbands included in each second subband to the base station; the UE receives the quantity of the first subbands included in each second subband that is fed back by the base station, and the quantity of the first subbands included in each second subband is determined by the base station based on the pre-selected quantity of the first subbands included in each second subband.

Specifically, when the base station determines, according to the pre-selected quantity of the first subbands included in each second subband, the quantity of the first subbands included in each second subband, the quantity of the first subbands included in each second subband is the same as or different from the pre-selected quantity of the first subbands included in each second subband.

For example, referring to FIG. 2, the UE determines, according to the system transmission bandwidth being 10 MHz, that pre-selected quantities of first subbands included in all second subbands of the M second subbands are 3, 3, 2 and 2, the base station may, for example, determine, according to the received 3, 3, 2 and 2, that the quantities of the first subbands included in all the second subbands of the M second subbands may be, for example, 3, 3, 2 and 2, 3, 3, 3 and 1, or 4, 2, 2 and 2, and the base station then feeds back the determined quantities of the first subbands included in all the second subbands to the UE, so that the UE can receive the quantities, sent by the base station, of the first subbands included in all the second subbands.

Further, after determining the quantity of the first subbands included in each second subband in the feedback manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, the UE determines, according to the system transmission bandwidth being 10 MHz, that pre-selected quantities of first subbands included in all second subbands of the M second subbands are 3, 3, 2 and 2, and sends 3, 3, 2 and 2 to the base station, the base station determines, based on 3, 3, 2 and 2, that the quantities of the first subbands included in all the second subbands may be, for example, 3, 3, 3 and 1, and then sends 3, 3, 3 and 1 to the UE, and the UE divides, based on 3, 3, 3 and 1, a subband 0, a subband 1, a subband 2, a subband 3, a subband 4, a subband 5, a subband 6, a subband 7, a subband 8 and a subband 9 in a continuous bandwidth division manner, so as to obtain four second subbands, where the first second subband of the four second subbands includes the subband 0, the subband 1 and the subband 2, the second second subband includes the subband 3, the subband 4 and the subband 5, the third second subband includes the subband 6, the subband 7 and the subband 8, and the fourth second subband includes the subband 9, where except that the fourth second subband includes only one first subband, frequencies corresponding to two neighboring first subbands in each second subband of three other second subbands are contiguous.

In this embodiment of this application, the quantity of the first subbands included in each second subband is determined in the feedback manner of the UE, environments in which different UEs are located are different, and corresponding channel characteristic parameters such as angular spread, a frequency correlation, and a spatial correlation are different, so that the selected pre-selected quantities of the first subbands included in all the second subbands may be the same or different. Therefore, when the base station determines, according to the pre-selected quantity of the first subbands included in each second subband, the quantity of the first subbands included in each second subband, the quantity of the first subbands included in each second subband may be the same as or different from the pre-selected quantity of the first subbands included in each second subband, so that the quantities of the first subbands included in all the second subbands may also be the same or different. Therefore, quantities of first subbands included in all second subbands of M second subbands corresponding to different UEs may be the same or different, and all second subbands of M second subbands corresponding to at least two UEs include different quantities of first subbands.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output MIMO wireless system.

In this embodiment of the present invention, in technical solutions of this application, a precoding matrix is selected based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 7

Embodiment 7 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least a first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a configuration manner of the base station.

Specifically, when the quantity of the first subbands included in each second subband of the M second subbands is determined in the configuration manner of the base station, the base station may configure, according to the N first subbands, the quantity of the first subbands included in each second subband of the M second subbands, and after configuring the quantity of the first subbands included in each second subband of the M second subbands, the base station feeds back the quantity of the first subbands included in each second subband of the M second subbands to the UE, so that the UE determines the M second subbands from the N first subbands according to the quantity of the first subbands included in each second subband of the M second subbands.

Specifically, when the quantity of the first subbands included in each second subband is determined in the configuration manner of the base station, the base station may determine the quantity of the first subbands included in each second subband according to the N first subbands. For example, quantities of first subbands included in all second subbands of the M second subbands may be a same value, or quantities of first subbands included in all second subbands of the M second subbands may be different values or values some of which are the same.

For example, referring to FIG. 2, when the base station determines the quantity of the first subbands included in each second subband of the M second subbands from a subband 0, a subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5.

Further, the base station determines, in the configuration manner of the base station, the quantity of the first subbands included in each second subband, and sends the quantity of the first subbands included in each second subband to the UE, so that the UE receives the quantity, fed back by the base station, of the first subbands included in each second subband. After receiving the quantity, fed back by the base station, of the first subbands included in each second subband, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, when the base station determines the quantity of the first subbands included in each second subband of the M second subbands from a subband 0, as subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5. If the quantity of the first subbands included in each second subband is 2, the base station feeds back the quantity of the first subbands included in each second subband being 2 to the UE, and the UE performs division in the continuous bandwidth division manner according to the quantity of the first subbands included in each second subband being 2, so that the N first subbands are divided into five second subbands, where the first second subband of the five second subbands includes the subband 0 and the subband 1, the second second subband includes the subband 2 and the subband 3, the third second subband includes the subband 4 and the subband 5, the fourth second subband includes the subband 6 and the subband 7, and the fifth second subband includes the subband 8 and the subband 9, where frequencies corresponding to two neighboring first subbands in each second subband are contiguous.

In this embodiment, when the quantity of the first subbands included in each second subbands is determined in the configuration manner of the base station, the quantity of the first subbands included in each second subband is determined according to the N first subbands, environments in which different UEs are located are different, and corresponding values of N may also be the same or different, so that the quantity of the first subbands included in each second subband that is determined in the configuration manner of the base station may be the same or different. Then, it may be determined that quantities of first subbands included in all second subbands of M second subbands corresponding to different UEs may be the same or different, and all second subbands of M second subbands corresponding to at least two UEs include different quantities of first subbands.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output MIMO wireless system.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 8

Embodiment 7 of the present invention puts forward a precoding matrix indicator feedback method. As shown in FIG. 1, a specific processing process of the method is as follows:

Step S101: UE receives a reference signal sent by a base station.

Step S102: The UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

Step S103: The UE feeds back the first PMI corresponding to each second subband to the base station, and feeds back the second PMI corresponding to each first subband to the base station.

In step S101, UE receives a reference signal sent by a base station.

In a specific implementation process, the reference signal may include a CSI RS, a DM RS, a CRS or the like.

Specifically, the base station may send, in a subframe, downlink control information to the UE by using a physical downlink control channel, so that the UE can receive the downlink control information, and acquire the reference signal according to the downlink control information. Certainly, the UE may further receive RRC signaling sent by the base station, and acquire, based on the RRC signaling, the reference signal.

Step S102 is performed next. In the step, the UE selects, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2.

In a specific implementation process, after receiving the reference signal, the UE then selects, based on the reference signal, a precoding matrix for each first subband of the N first subbands from the codebook, and each precoding matrix in the codebook is denoted by at least as first PMI and a second PMI, where the system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Specifically, before the UE selects a precoding matrix for each first subband of N first subbands in a system transmission bandwidth from a codebook, the M second subbands further need to be determined from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the bean vectors is improved.

Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a predefinition manner.

Specifically, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

For example, referring to FIG. 2, the base station and the UE may configure the quantity of the first subbands included in each second subband of the M second subbands according to the predefinition rule. If the predefinition rule is that the quantities of first subbands included in all the second subbands are partially the same, the quantities of the first subbands included in all the second subbands of the M second subbands are, for example, 3, 3, 2 and 2, or 4, 4, 1 and 1.

Further, after determining the quantity of the first subbands included in each second subband of the M second subbands according to the predefinition manner, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, the base station and the UE may configure the quantity of the first subbands included in each second subband of the M second subbands according to the predefinition rule. If the predefinition rule is that the quantities of first subbands included in all the second subbands are partially the same, it may be determined that the quantities of the first subbands included in all the second subbands of the M second subbands are, for example, 3, 3, 2 and 2. If division is performed in the continuous bandwidth division manner, four second subbands are determined from a subband 0, a subband 1, a subband 2, a subband 3, a subband 4, a subband 5, a subband 6, a subband 7, a subband 8 and a subband 9, where the four second subbands are, for example, a subband A, a subband B, a subband C and a subband D, where the subband A includes the subband 0, the subband 1 and the subband 2; the subband B includes the subband 3, the subband 4 and the subband 5; the subband C includes the subband 6 and the subband 7; and the subband D includes the subband 8 and the subband 9, where frequencies corresponding to two neighboring first subbands in each second subband are contiguous.

In this embodiment, the quantity of the first subbands included in each second subband is determined in the predefinition manner, environments in which different UEs are located are different, and corresponding channel characteristic parameters such as angular spread, a frequency correlation, and a spatial correlation are different, so that the quantities, determined in the predefinition manner, of the first subbands included in all the second subbands may be the same or different. Then, it may be determined that the quantities of first subbands included in all the second subbands of the M second subbands corresponding to different UEs may be the same or different.

Step S103 is performed next. In the step, the UE feeds back the first PMI corresponding to each second subband to the base station, and feeds back the second PMI corresponding to each first subband to the base station.

In a specific implementation process, after determining the first PMI corresponding to each second subband of the M second subbands, and determining the second PMI corresponding to each first subband of the N first subbands by means of step S103, the UE feeds back the first PMI corresponding to each second subband to the base station, and feeds back the second PMI corresponding to each first subband to the base station.

Specifically, the first PMI and the second PMI have different time domain granularities or frequency domain granularities. For example, the first PMI corresponds to an entire frequency bandwidth, and the second PMI corresponds to an entire frequency band or a subband.

Specifically, when the M first PMIs are fed back, the M first PMIs may be coded in a coding scheme such as joint coding or differential coding, and the M coded first PMIs are fed back to the base station.

Specifically, the UE may send the first PMI and the second PMI to the base station by using a PUCCH or a PUSCH.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation, and the technical solution of this embodiment of this application can be applied to a multiple-input multiple-output MIMO wireless system.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 9

Figure 5:
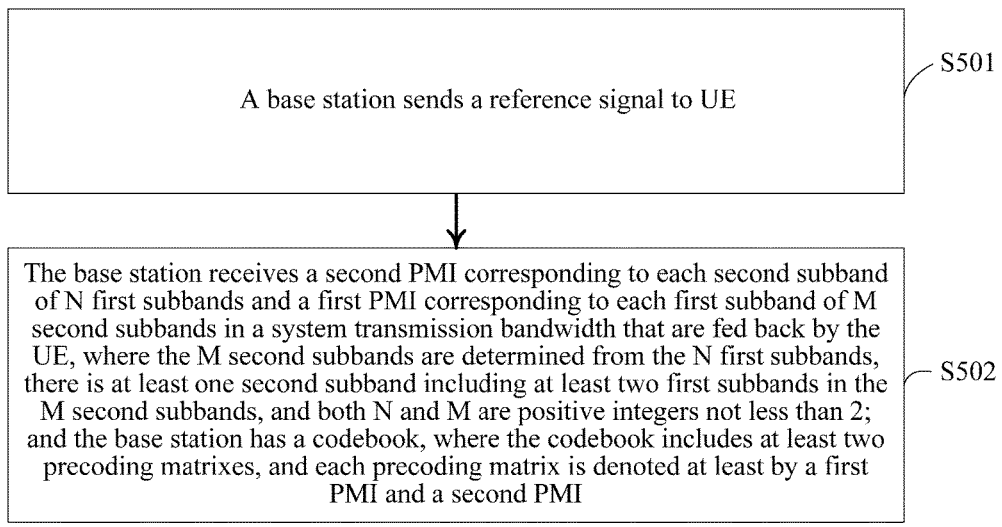
FIG. 5 is a flowchart of a precoding matrix indicator receiving method according to an embodiment of this application.

Based on a technical idea the same as that of the foregoing precoding matrix indicator feedback method, Embodiment 9 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subtend and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

Specifically, when the M second subbands are determined from the N first subbands, the UE first determines a value of M, and then determines the M second subbands from the N first subbands according to the value of M, where when determining the value of M, the UE determines the value of M in a configuration manner of the UE. For example, after determining the value of M, the UE may divide the N first subbands into the M second subbands. Moreover, because at least one second subband including at least two first subbands exists, the value of M is less than a value of N.

Specifically, a step of determining, by the UE, a value of M specifically includes: determining, by the UE based on the reference signal, a channel estimation; and determining, by the UE, the value of M according to the channel estimation and the codebook, where a capacity gain between a system capacity obtained when the M second subbands are selected and a system capacity obtained when M−1 second subbands are selected is greater than a threshold. Certainly, it may further be that a gain between system performance obtained when the M second subbands are selected and system performance obtained when M−1 second subbands are selected is greater than a threshold, where the system performance includes a system capacity, a system throughput, systematic spectral efficiency or the like.

Specifically, when the UE determines a value of M according to the channel estimation and the codebook, the threshold is determined according to an actual situation, and the value of M is not greater than a quantity of precoding matrixes in the codebook. For example, if the quantity of the precoding matrixes is 5, the value of M is 5 maximally, and 2 minimally.

In a specific implementation process, after determining the value of M, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

M second subbands correspond to M first PMIs, so that each first PMI corresponds to a part in the system transmission bandwidth, and a bandwidth of each part in the system transmission bandwidth corresponds to a first PMI. Therefore, the M first PMIs cover a beam phase change of the system transmission bandwidth, reducing a system performance loss; and because each first PMI corresponds to only one part in the system transmission bandwidth, quantization granularity precision of the beam vectors is improved.

Further, there are at least two second subbands corresponding to different first PMIs in the M second subbands.

Because the value of M is determined according to the channel estimation and the codebook, and when environments in which different UEs are located are different, corresponding channel characteristic parameters such as angular spread, a frequency correlation, and a spatial correlation are different, and/or, the codebook differs, quantities of second subbands corresponding to UEs, that is, values of M, may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Specifically, after determining the M second subbands, the UE selects a precoding matrix for each subband of the N subbands from the codebook, and the UE feeds bank the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

For example, referring to FIG. 2 and Table 1, after the UE determines, according to the channel estimation and the codebook, that the value of M is 4, when the UE divides the N first subbands into M second subbands in the continuous bandwidth division manner, four second subbands are determined from a subband 0, a subband 1, a subband 2, a subband 3, a subband 4, a subband 5, a subband 6, a subband 7, a subband 8 and a subband 9, and the four second subbands are a subband A, a subband B, a subband C and a subband D, where the subband A includes the subband 0, the subband 1 and the subband 2, the subband B includes the subband 3, the subband 4 and the subband 5, the subband C includes the subband 6 and the subband 7, and the subband D includes the subband 8 and the subband 9. Each second subband of the four second subbands corresponds to a first PMI, and the UE feeds back four first PMIs to the base station, so that the base station determines, according to the quantity of the first PMIs fed back by the user, that the value of M is 4, and then divides the N first subbands into the M second subbands in a manner the same as that for the UE, that is, in the continuous bandwidth division manner, and therefore the base station may determine that the four second subbands are the subband A, the subband B, the subband C and the subband D, where the subband A includes the subband 0, the subband 1 and the subband 2, the subband B includes the subband 3, the subband 4 and the subband 5, the subband C includes the subband 6 and the subband 7, and the subband D includes the subband 8 and the subband 9.

Further, if the base station receives that the first PMI corresponding to the subband A is 4, the first PMI corresponding to the subband B is 7, the first PMI corresponding to the subband C is 9, and the first PMI corresponding to the subband D is 11; and that the second PMI corresponding to the subband 0 is 0, the second PMI corresponding to the subband 1 is 2, the second PMI corresponding to the subband 2 is 9, the second PMI corresponding to the subband 3 is 3, the second PMI corresponding to the subband 4 is 5, the second PMI corresponding to the subband 5 is 11, the second PMI corresponding to the subband 6 is 1, the second PMI corresponding to the subband 7 is 3, the second PMI corresponding to the subband 8 is 3, and the second PMI corresponding to the subband 9 is 10, where the PMIs are fed back by the UE, it may be determined from Table 1 that a precoding matrix corresponding to the subband 0 is $W_{2\times4,1}^{(1)}$, a precoding matrix corresponding to the subband 1 is $W_{2\times4,2}^{(1)}$ and a precoding matrix corresponding to the subband 2 is $W_{2\times4+2,1}^{(1)}$; a precoding matrix corresponding to the subband 3 is $W_{2\times7,3}^{(1)}$, a precoding matrix corresponding to the subband 4 is $W_{2\times7+1,1}^{(1)}$ and a precoding matrix corresponding to the subband 5 is $W_{2\times7+2,3}^{(1)}$; a precoding matrix corresponding to the subband 6 is $W_{2\times9,1}^{(1)}$ and a precoding matrix corresponding to the subband 7 is $W_{2\times9,3}^{(1)}$; and it precoding matrix corresponding to the subband 8 is $W_{2\times11,3}^{(1)}$ and a precoding matrix corresponding to the subband 9 is $W_{2\times11+2,2}^{(1)}$.

In a specific implementation process, after the sending, by a base station, a reference signal to UE, the method further includes: receiving, by the base station, a value of M reported by the UE.

Specifically, after the UE determines the value of M, the UE reports the value of M to the base station, so that the base station can receive the value of M, and determine the M second subbands from the N first subbands in a manner the same as that for the UE.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M $W_1$s are in a one-to-one correspondence with M second subbands, so that each $W_1$ corresponds to a part in the system transmission bandwidth, and a bandwidth of each part in the system transmission bandwidth corresponds to a $W_1$, and M is an integer not less than 2. Therefore, multiple $W_1$s cover a beam phase change of the entire system transmission bandwidth, reducing a system performance loss; and because each $W_1$ corresponds to only one part in the system transmission bandwidth, quantization granularity precision of the beam vectors is improved.

Embodiment 10

Based on a technical idea the same as that of the foregoing precoding matrix indicator feedback method. Embodiment 10 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, where the codebook includes at least two precoding matrixes, and each precoding matrix is denoted by at least the first PMI and the second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where when determining the value of M, the UE determines the value of M in a feedback manner of the UE. When the value of M is determined in the feedback manner of the UE, a step of determining the value of M specifically includes: receiving, by the base station, a pre-selected value of M reported by the UE; and determining, by the base station, the value of M according to the pre-selected value of M, and after the value of M is determined, sending, by the base station, the value of M to the UE.

Specifically, when the value of M is determined in the feedback manner of the UE, the UE selects the pre-selected value of M, and then reports the pre-selected value of M to the base station, and after receiving the pre-selected value of M, the base station determines the value of M according to the pre-selected value of M, and the base station feeds back the determined value of M to the UE, so that the UE can receive the value of M.

Specifically, when the base station determines the value of M according to the pre-selected value of M, the value of M may be the pre-selected value of M, or may be greater than or less than the pre-selected value of M, which is not specifically limited in this application. For example, if the pre-selected value of M received by the base station is 3, the value of M may be 3, or may be a value greater than 3, such as 4 or 5; or may further be a value less than 3, such as 2.

For example, referring to FIG. 4, the user equipment first determines the pre-selected value of M, where the pre-selected value of M is, for example, an integer not less than 2 such as 2, 3, or 4, and then performs step S401 of sending the pre-selected value of M, so that the base station can receive the pre-selected value of M. After receiving the pre-selected value of M, the base station performs step S402 of determining the value of M according to the pre-selected value of M. After determining the value of M by means of step S402, the base station then performs step S403 of feeding back the value of M, so that the user equipment can receive the value of M fed back by the base station, and then determine, based on the value of M, the M second subbands from the N first subbands. For details, refer to the foregoing manner.

Likewise, after determining the value of M in the feedback manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

The value of M is determined in the feedback manner of the UE, environments in which different UEs are located are different, and corresponding channel characteristic parameters such as angular spread, a frequency correlation, and a spatial correlation are different, so that selected pre-selected values of M may be the same or different. Therefore, when the base station determines the value of M according to the pre-selected value of M, the value of M may be the pre-selected value of M, or may be greater than or less than the pre-selected value of M, so that values of M may be the same or different. Therefore, values of M corresponding to different UEs may be the same or different, and values of M corresponding to at least two UEs may also be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

For example, referring to FIG. 4 and FIG. 2, when the user equipment sends the pre-selected value of M such as 5 to the base station, the base station determines, based on the pre-selected value of M, that the value of M is 4, and then sends 4 to the user equipment. Therefore, the user equipment determines that the value of M is 4, then divides the N first subbands in the continuous bandwidth division manner, and determines four second subbands from a subband 0, a subband 1, a subband 2, a subband 3, a subband 4, a subband 5, a subband 6, a subband 7, a subband 8 and a subband 9. For example, the four second subbands are a subband A, a subband B, a subband C and a subband D, where the subband A includes the subband 0, the subband 1 and the subband 2, the subband B includes the subband 3, the subband 4 and the subband 5, the subband C includes the subband 6 and the subband 7, and the subband D includes the subband 8 and the subband 9. Likewise, the base station also divides the N first subbands in the continuous bandwidth division manner, and determines four second subbands being the subband A, the subband B, the subband C and the subband D from the N first subbands, where bandwidths corresponding to each two neighboring first subbands included in each second subband of the subbands A, B, C and D are contiguous.

Further, still referring to Table 1, if the base station receives that the first PMI corresponding to the subband A is 4, the first PMI corresponding to the subband B is 7, the first PMI corresponding to the subband C is 9, and the first PMI corresponding to the subband D is 11; and that the second PMI corresponding to the subband 0 is 0, the second PMI corresponding to the subband 1 is 2, the second PMI corresponding to the subband 2 is 9, the second PMI corresponding to the subband 3 is 3, the second PMI corresponding to the subband 4 is 5, the second PMI corresponding to the subband 5 is 11, the second PMI corresponding to the subband 6 is 1, the second PMI corresponding to the subband 7 is 3, the second PMI corresponding to the subband 8 is 3, and the second PMI corresponding to the subband 9 is 10, where the PMIs are fed back by the UE, it may be determined from Table 1 that a precoding matrix corresponding to the subband 0 is $W_{2\times4,1}^{(1)}$, a precoding matrix corresponding to the subband 1 is $W_{2\times4,2}^{(1)}$ and a precoding matrix corresponding to the subband 2 is $W_{2\times4+2,1}^{(1)}$; a precoding matrix corresponding to the subband 3 is $W_{2\times7,3}^{(1)}$, a precoding matrix corresponding to the subband 4 is $W_{2\times7+1,1}^{(1)}$ and a precoding matrix corresponding to the subband 5 is $W_{2\times7+2,3}^{(1)}$; a precoding matrix corresponding to the subband 6 is $W_{2\times9,1}^{(1)}$ and a precoding matrix corresponding to the subband 7 is $W_{2\times9,3}^{(1)}$; and a precoding matrix corresponding to the subband 8 is $W_{2\times11,3}^{(1)}$ and a precoding matrix corresponding to the subband 9 is $W_{2\times11+2,2}^{(1)}$.

Certainly, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 11

Based on a technical idea the same as that of the foregoing precoding matrix indicator feedback method, Embodiment 11 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, where the codebook includes at least two precoding matrixes, and each precoding matrix is denoted by at least the first PMI and the second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where the value of M is configured by the base station, that is, it is represented that the value of M is determined in a configuration manner of the base station, and the base station sends the value of M determined in the configuration manner of the base station to the UE, so that the UE receives the value of M, and then determines the M second subbands from the N first subbands according to the value of M.

Specifically, when the value of M is determined in the configuration manner of the base station, the base station may directly set the value of M, or may determine the value of M according to the system transmission bandwidth. For example, the value of M set by the base station is, for example, a value such as 3, 4, or 5. Then, the base station sends the value of M to the UE, so that the UE receives the value of M, and then determines the M second subbands from the N first subbands according to the value of M.

Specifically, when the base station determines the value of M according to the system transmission bandwidth, for example, when the system transmission bandwidth is not greater than 10 MHz, the base station sets the value of M to a value such as 3, 4, or 5, or when the system transmission bandwidth is greater than 10 MHz, the base station sets the value of M to a value such as 4, 5, or 6. Then, the base station sends the value of M to the UE, so that the UE receives the value of M, and then determines the M second subbands from the N first subbands according to the value of M.

Likewise, after receiving the value of M configured by the base station, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Values of M are configured by the base station, environments in which different UEs are located are different, and corresponding channel characteristic parameters such as angular spread, a frequency correlation, and a spatial correlation are different, so that the values of M configured by the base station may be the same or different, and then it may be determined that values of M corresponding to different UEs may be the same or different, and values of M corresponding to at least two UEs may also be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

For example, referring to FIG. 2, if the system transmission bandwidth is 10 MHz, and the base station determines, according to the system transmission bandwidth, that the value of M is 4, the value of M is fed back to the UE, so that the UE receives the value of M fed back by the base station. Therefore, the UE determines that the value of M is 4, then divides the N first subbands in the discontinuous bandwidth division manner, and determines four second subbands from a subband 10, a subband 11, a subband 12, a subband 13, a subband 14, a subband 15, a subband 16, a subband 17, a subband 18 and a subband 19. For example, the four second subbands are a subband A1, a subband B1, a subband C1 and a subband D1, where the subband A1 includes the subband 10, the subband 12 and the subband 14, the subband B1 includes the subband 11, the subband 13 and the subband 15, the subband C1 includes the subband 16 and the subband 18, and the subband D1 includes the subband 17 and the subband 19. Likewise, the base station also divides the N first subbands in the discontinuous bandwidth division manner, and determines four second subbands being the subband A1, the subband B1, the subband C1 and the subband D1 from the N first subbands, where bandwidths corresponding to each two neighboring first subbands included in each second subband of the subbands A1, B1, C1 and D1 are non-contiguous.

Further, the base station may further select a corresponding precoding matrix from the codebook according to the received second PMI corresponding to each second subband of A1, B1, C1 and D1 and the received first PMI corresponding to each first subband of the subband 10 to the subband 19, where the PMIs are fed back by the UE.

Certainly, a first PMI corresponds to a $W_1$, so that the base station may determine, according to that the quantity of the first PMI fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 12

Based on a technical idea the same as that of the foregoing precoding matrix indicator feedback method, Embodiment 12 of this application provides a precoding matrix indicator receiving method. As shown in FIG. 5, a specific processing process of the method is as follows:

Step S501: A base station sends a reference signal to UE.
Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a value of M, and then determines the M second subbands from the N first subbands according to the value of M, where the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

Likewise, after determining the value of M in the predefinition manner, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

Values of M are determined in the predefinition manner, environments in which different UEs are located are different, and corresponding channel characteristic parameters such as angular spread, a frequency correlation, and a spatial correlation are different, so that the values of M that are determined in the predefinition manner may be the same or different, and then it may be determined that values of M corresponding to different UEs may be the same or different, and values of M corresponding to at least two UEs may also be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, find values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in an second subbands of M second subbands corresponding to the two UEs may be the same. Therefore, each second subband of M second subbands corresponding to at least two UEs includes a different or same quantity of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

For example, referring to FIG. 2, when the system transmission bandwidth is 10 MHz, the predefinition manner is that a quantity of first subbands included in each second subband is the same, so that when the UE and the base station determine the value of M according to the predefinition manner, the value of M may be, for example, 2, or 5. If M=5, each second subband includes two first subbands. For example, the first second subband includes a subband 0 and a subband 1, the second second subband includes a subband 2 and a subband 3, the third second subband includes a subband 4 and a subband 5, the fourth second subband includes a subband 6 and a subband 7, and the fifth second subband includes a subband 8 and a subband 9.

Certainly, the base station may also obtain a quantity of is according to the first PMI fed back by the UE so as to obtain the value of M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 13

Based on a technical idea the same as that of the foregoing precoding matrix indicator feedback method, Embodiment 13 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a configuration manner of the UE.

Specifically, when the quantity of the first subbands included in each second subband is determined in the configuration manner of the UE, the UE may determine the quantity of the first subbands included in each second subband according to the N first subbands. For example, quantities of first subbands included in all second subbands of the M second subbands may be a same value, or quantities of first subbands included in all second subbands of the M second subbands may be different values or values some of which are the same.

Further, after determining the quantity of the first subbands included in each second subband in the configuration manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

In this embodiment, when the quantity of the first subbands included in each second subbands is determined in the configuration manner of the UE, the quantity of the first subbands included in each second subband is determined according to the N first subbands, environments in which different UEs are located are different, and corresponding values of N may also be the same or different, so that the quantity of the first subbands included in each second subband that is determined in the configuration manner of the UE may be the same or different. Then, it may be determined that quantities of first subbands included in all second subbands of M second subbands corresponding to different UEs may be the same or different, and all second subbands of M second subbands corresponding to at least two UEs include different quantities of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, when obtaining according to the first PMI fed back by the UE that a quantity of $W_1$s is M, the base station determines the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

Specifically, the base station may also obtain a quantity of $W_1$s according to the first PMI fed back by the UE so as to obtain the value of M, and determine the M second subbands from the N first subbands in a manner the same as that for the UE, where the first $W_1$ corresponds to the first second subband, the second $W_1$ corresponds to the second second subband the rest can be deduced by analogy, until the $N^{th}$ second subband corresponds to $W_1^N(m_n)$.

For example, referring to FIG. 2, when the UE determines the quantity of the first subbands included in each second subband of the M second subbands from a subband 0, a subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5. When the quantity of the first subbands included in each second subband is 2, if division is performed in the continuous bandwidth division manner, the N first subbands are divided into five second subbands, where the first second subband of the five second subbands includes the subband 0 and the subband 1, the second second subband includes the subband 2 and the subband 3, the third second subband includes the subband 4 and the subband 5, the fourth second subband includes the subband 6 and the subband 7, and the fifth second subband includes the subband 8 and the subband 9, so that the UE sends five first PMIs to the base station. Therefore, the base station determines, according to a quantity of the first PMIs, that the value of M is 5, and then determines the M second subbands in a manner the same as that for the UE, that is, determines that quantities of first subbands included in all the second subbands are a same value, and therefore, may determine that the N first subbands are divided into five second subbands, where the first second subband of the five second subbands includes the subband 0 and the subband 1, the second second subband includes the subband 2 and the subband 3, the third second subband includes the subband 4 and the subband 5, the fourth second subband includes the subband 6 and the subband 7, and the fifth second subband includes the subband 8 and the subband 9, where frequencies corresponding to two neighboring first subbands in each second subband are contiguous.

The precoding matrix in this embodiment of this application may be a precoding matrix obtained after row or column permutation.

In another embodiment, after the sending, by a base station, a reference signal to UE, the method further includes: receiving, by the base station, a quantity of first subbands included in each second subband of the M second subbands, where the quantity is reported by the UE.

In a specific implementation process, when the base station does not acquire the quantity of the first subbands included in each second subband of the M second subbands, the UE may report the quantity of the first subbands included in each second subband of the M second subbands to the base station.

When the UE selects a precoding matrix for each first subband of the N first subbands in the system transmission bandwidth from the codebook according to the received reference signal sent by the base station, the UE may further report the quantity of the first subbands included in each second subband of the M second subbands to the base station, so that before receiving the first PMI and the second PMI that are fed back by the UE, the base station already determines the M second subbands from the N first subbands in a manner the same as that for the UE. Therefore, when receiving the first PMI and the second PMI that are fed back by the UE, the base station can acquire a precoding matrix corresponding to each first subband more quickly, so that working efficiency is improved.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 14

Based on a technical idea the same as that of the foregoing precoding matrix indicator feedback method, Embodiment 14 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a feedback manner of the UE.

Specifically, when the quantity of the first subbands included in each second subband of the M second subbands is determined in the feedback manner of the UE, the UE reports a pre-selected quantity of the first subbands included in each second subband to the base station; the base station determines the quantity of the first subbands included in each second subband of the M second subbands according to the pre-selected quantity of first subbands included in each second subband, and feeds back the quantity of the first subbands included in each second subband to the UE, so that the UE determines the M second subbands from the N first subbands according to the quantity of the first subbands included in each second subband.

Specifically, when the base station determines, according to the pre-selected quantity of the first subbands included in each second subband, the quantity of the first subbands included in each second subband, the quantity of the first subbands included in each second subband is the same as or different from the pre-selected quantity of the first subbands included in each second subband.

For example, referring to FIG. 2, the UE determines, according to the system transmission bandwidth being 10 MHz, that pre-selected quantities of first subbands included in all second subbands of the M second subbands are 3, 3, 2 and 2, the base station may, for example, determine, according to the received 3, 3, 2 and 2, that the quantities of the first subbands included in all the second subbands of the M second subbands may be, for example, 3, 3, 2 and 2, 3, 3, 3 and 1, or 4, 2, 2 and 2, and the base station then feeds back the determined quantities of the first subbands included in all the second subbands to the UE, so that the UE can receive the quantities, sent by the base station, of the first subbands included in all the second subbands.

Further, after determining the quantity of the first subbands included in each second subband in the feedback manner of the UE, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, the UE determines, according to the system transmission bandwidth being 10 MHz, that pre-selected quantities of first subbands included in all second subbands of the M second subbands are 3, 3, 2 and 2, and sends 3, 3, 2 and 2 to the base station, the base station determines, based on 3, 3, 2 and 2, that the quantities of the first subbands included in all the second subbands may be for example, 3, 3, 3 and 1, and then sends 3, 3, 3 and 1 to the UE, and the UE divides, based on 3, 3, 3 and 1, a subband 0, a subband 1, a subband 2, a subband 3, a subband 4, a subband 5, a subband 6, a subband 7, a subband 8 and a subband 9 in a continuous bandwidth division manner, so as to obtain four second subbands, where the first second subband of the four second subbands includes the subband 0, the subband 1 and the subband 2, the second second subband includes the subband 3, the subband 4 and the subband 5, the third second subband includes the subband 6, the subband 7 and the subband 8, and the fourth second subband includes the subband 9, where except that the fourth second subband includes only one first subband, frequencies corresponding to two neighboring first subbands in each second subband of three other second subbands are contiguous.

In this embodiment of this application, the quantity of the first subbands included in each second subband is determined in the feedback manner of the UE, environments in which different UEs are located are different, and corresponding channel characteristic parameters such as angular spread, a frequency correlation, and a spatial correlation are different, so that the selected pre-selected quantities of the first subbands included in all the second subbands may be the same or different. Therefore, when the base station determines, according to the pre-selected quantity of the first subbands included in each second subband, the quantity of the first subbands included in each second subband, the quantity of the first subbands included in each second subband may be the same as or different from the pre-selected quantity of the first subbands included in each second subband, so that the quantities of the first subbands included in all the second subbands may also be the same or different. Therefore, quantities of first subbands included in all second subbands of M second subbands corresponding to different UEs may be the same or different, and all second subbands of M second subbands corresponding to at least two UEs include different quantities of first subbands.

Specifically, after determining the M second subbands, the UE selects a precoding matrix for each subband of the N subbands from the codebook, and the UE feeds hack the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, when obtaining according to the first PMI fed back by the UE that a quantity of $W_1$s is M, the base station determines the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

For example, referring to FIG. 2, the UE determines, according to the system transmission bandwidth being 10 MHz, that pre-selected quantities of first subbands included in all second subbands of the M second subbands are 3, 3, 2 and 2, and sends 3, 3, 2 and 2 to the base station, the base station determines, based on 3, 3, 2 and 2, that the quantities of the first subbands included in all the second subbands may be, for example, 3, 3, 3 and 1, and then sends 3, 3, 3 and 1 to the UE, and the UE and the base station determine the M second subbands in a same manner, divide the subband 0, the subband 1, the subband 2, the subband 3, the subband 4, the subband 5, the subband 6, the subband 7, the subband 8 and the subband 9 according to 3, 3, 3 and 1, and then obtain four second subbands, where the first second subband of the four second subbands includes the subband 0, the subband 1 and the subband 2, the second second subband includes the subband 3, the subband 4 and the subband 5, the third second subband includes the subband 6, the subband 7 and the subband 8, and the fourth second subband includes the subband 9, where except that the fourth second subband includes only one first subband, frequencies corresponding to two neighboring first subbands in each second subband of three other second subbands are contiguous.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 15

Based on a technical idea the same as that of the foregoing precoding matrix indicator feedback method, Embodiment 15 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in which the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a configuration manner of the base station.

Specifically, when the quantity of the first subbands included in each second subband of the M second subbands is determined in the configuration manner of the base station, the base station may configure, according to the N first subbands, the quantity of the first subbands included in each second subband of the M second subbands, and after configuring the quantity of the first subbands included in each second subband of the M second subbands, the base station feeds back the quantity of the first subbands included in each second subband of the M second subbands to the UE, so that the UE determines the M second subbands from the N first subbands according to the quantity of the first subbands included in each second subband of the M second subbands.

Specifically, when the quantity of the first subbands included in each second subband is determined in the configuration manner of the base station, the base station may determine the quantity of the first subbands included in each second subband according to the N first subbands. For example, quantities of first subbands included in all second subbands of the M second subbands may be a same value, or quantities of first subbands included in all second subbands of the M second subbands may be different values or values some of which are the same.

For example, referring to FIG. 2, when the base station determines the quantity of the first subbands included in each second subband of the M second subbands from a subband 0, a subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5.

Further, the base station determines, in the configuration manner of the base station, the quantity of the first subbands included in each second subband, and sends the quantity of the first subbands included in each second subband to the UE, so that the UE receives the quantity, fed back by the base station, of the first subbands included in each second subband. After receiving the quantity, fed back by the base station, of the first subbands included in each second subband, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, when the base station determines the quantity of the first subbands included in each second subband of the M second subbands from a subband 0, a subband 1, a subband 2, a subband 3, a subband 4, a subband 5, a subband 6, a subband 7, a subband 8 and a subband 9, if the quantities of the first subbands included in all the second subbands are a same value, it may be determined that the quantity of the first subbands included in each second subband may be 2 or 5. If the quantity of the first subbands included in each second subband is 2, the base station feeds back the quantity of the first subbands included in each second subband being 2 to the UE, and the UE performs division in the continuous bandwidth division manner according to the quantity of the first subbands included in each second subband being 2, so that the N first subbands are divided into five second subbands, where the first second subband of the five second subbands includes the subband 0 and the subband 1, the second second subband includes the subband 2 and the subband 3, the third second subband includes the subband 4 and the subband 5, the fourth second subband includes the subband 6 and the subband 7, and the fifth second subband includes the subband 8 and the subband 9, where frequencies corresponding to two neighboring first subbands in each second subband are contiguous.

In this embodiment, when the quantity of the first subbands included in each second subbands is determined in the configuration manner of the base station, the quantity of the first subbands included in each second subband is determined according to the N first subbands, environments in which different UEs are located are different, and corresponding values of N may also be the same or different, so that the quantity of the first subbands included in each second subband that is determined in the configuration manner of the base station may be the same or different. Then, it may be determined that quantities of first subbands included in all second subbands of M second subbands corresponding to different UEs may be the same or different, and all second subbands of M second subbands corresponding to at least two UEs include different quantities of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 16

Based on a technical idea the same as that of the foregoing precoding matrix indicator feedback method, Embodiment 16 of this application provides a precoding matrix indicator receiving method. As shown in FIG. 5, a specific processing process of the method is as follows:

Step S501: A base station sends a reference signal to UE.

Step S502: The base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

In step S501, a base station sends a reference signal to UE. In a specific implementation process, the reference signal may include a CSI RS, a DM RS, or a CRS.

Specifically, the base station may send, in a subframe, downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Step S502 is performed next. In the step, the base station receives a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and can select a corresponding precoding matrix from the codebook according to the first PMI corresponding to each second subband and the second PMI corresponding to each first subband.

The system transmission bandwidth is a system transmission bandwidth, of a carrier, that is configured for the UE and that is used for channel measurement, and N first subbands in the system transmission bandwidth are determined according to a first subband defined in a protocol between the UE and the base station.

Further, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

In a specific implementation process, after the base station sends the reference signal, the UE can receive the reference signal, then select, based on the reference signal, a precoding matrix for each first subband of the N first subbands from the codebook, were each precoding matrix in the codebook is denoted by at least a first PMI and a second PMI, and then feed back the first PMI corresponding to each second subband and the second PMI corresponding to each first subband to the base station, so that the base station can receive the first PMI corresponding to each second subband and the second PMI corresponding to each first subband, and search the codebook for a corresponding precoding matrix according to the first PMI corresponding to each second subband and the second PMI corresponding to each first subband.

Specifically, after selecting a precoding matrix for each first subband of the N first subbands from the codebook, the UE feeds back the first PMI corresponding to each second subband to the base station, and feeds back the second PMI corresponding to each first subband to the base station, so that the base station receives the first PMI corresponding to each second subband and the second PMI corresponding to each first subband that are fed back by the UE. A specific implementation process in winch the UE selects a precoding matrix for each first subband of the N first subbands from the codebook is described below, which is specifically as follows:

In a specific implementation process, after receiving the reference signal, and before selecting a precoding matrix for each first subband of N first subbands in a system transmission bandwidth from the codebook, the UE further needs to determine the M second subbands from the N first subbands, and after determining the M second subbands, select a precoding matrix for each first subband of the N first subbands in the system transmission bandwidth from the codebook, where each first subband of the N first subbands corresponds to a second PMI, each second subband of the M second subbands corresponds to a first PMI, all first subbands included in the M second subbands are the N first subbands, and each first subband can be included in only one second subband. Moreover, each second subband of the M second subbands corresponds to a first PMI, so that all first subbands included in a second subband including at least two first subbands correspond to a same first PMI.

First PMIs corresponding to at least two second subbands of the M second subbands are different. Therefore, beam phase changes of the system transmission bandwidth may be covered by using different first PMIs, so as to reduce a system performance loss, so that quantization granularity precision of beam vectors is improved. Further, there are at least two second subbands corresponding to different first PMIs in the M second subbands.

Specifically, when the M second subbands are determined from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE determines the quantity of the first subbands included in each second subband in a predefinition manner.

Specifically, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

For example, referring to FIG. 2, the base station and the UE may configure the quantity of the first subbands included in each second subband of the M second subbands according to the predefinition rule. If the predefinition rule is that the quantities of first subbands included in all the second subbands are partially the same, the quantities of the first subbands included in all the second subbands of the M second subbands are, for example, 3, 3, 2 and 2, or 4, 4, 1 and 1.

Further, after determining the quantity of the first subbands included in each second subband of the M second subbands according to the predefinition manner, the UE may divide the N first subbands into the M second subbands in a continuous bandwidth division manner or a discontinuous bandwidth division manner, where when the UE performs division in the continuous bandwidth division manner, frequencies corresponding to two neighboring first subbands in each second subband are contiguous; or when the UE performs division in the discontinuous bandwidth division manner, there is at least one group of two neighboring first subbands corresponding to non-contiguous frequencies in each second subband.

For example, referring to FIG. 2, the base station and the UE may configure the quantity of the first subbands included in each second subband of the M second subbands according to the predefinition rule. If the predefinition rule is that the quantities of first subbands included in all the second subbands are partially the same, it may be determined that the quantities of the first subbands included in all the second subbands of the M second subbands are, for example, 3, 3, 2 and 2. If division is performed in the continuous bandwidth division manner, four second subbands are determined from a subband 0, a subband 1, a subband 2, a subband 3, a subband 4, a subband 5, a subband 6, a subband 7, a subband 8 and a subband 9, where the four second subbands are, for example, a subband A, a subband B, a subband C and a subband D, where the subband A includes the subband 0, the subband 1 and the subband 2; the subband B includes the subband 3, the subband 4 and the subband 5; the subband C includes the subband 6 and the subband 7; and the subband D includes the subband 8 and the subband 9, where frequencies corresponding to two neighboring first subbands in each second subband are contiguous.

In this embodiment, the quantity of the first subbands included in each second subband is determined in the predefinition manner, environments in which different UEs are located are different, and corresponding channel characteristic parameters such as angular spread, a frequency correlation, and a spatial correlation are different, so that the quantities, determined in the predefinition manner, of the first subbands included in all the second subbands may be the same or different. Then, it may be determined that quantities of first subbands included in all second subbands of M second subbands corresponding to different UEs may be the same or different, and all second subbands of M second subbands corresponding to at least two UEs include different quantities of first subbands.

Specifically, after determining the M second subbands, the UE selects a precoding matrix for each subband of the N subbands from the codebook, and the UE feeds back the first PMI corresponding to each second subband to the base station, and feeds back the second PMI corresponding to each first subband to the base station, so that the base station can receive the first PMI corresponding to each second subband and the second PMI corresponding to each first subband.

The first PMI and the second PMI have different time domain granularities or frequency domain granularities. For example, the first PMI corresponds to an entire frequency bandwidth, and the second PMI corresponds to an entire frequency band or a subband.

Further, when the M first PMIs are fed back, the M first PMIs may be coded in a coding scheme such as joint coding or differential coding, and the M coded first PMIs are fed back to the base station, so that the base station can receive the first PMI corresponding to each second subband and the second PMI corresponding to each first subband.

Specifically, the UE may send the first PMI and the second PMI to the base station by using a PUCCH or a PUSCH, so that the base station can receive the first PMI corresponding to each second subband and the second PMI corresponding to each first subband.

Specifically, a first PMI corresponds to a $W_1$, so that the base station may determine, according to that the quantity of the first PMIs fed back by the UE is M, that a quantity of $W_1$s is also M, and determine the M second subbands from the N first subbands in a manner the same as that for the UE, where the first $W_1$ corresponds to the first second subband, the second $W_1$ corresponds to the second second subband, the rest can be deduced by analogy, until the $N^{th}$ second subband corresponds to $W_1^N(m_n)$.

The precoding matrix in this embodiment of this application may be a precoding matrix obtained after row or column permutation.

In this embodiment of the present invention, in the technical solution of this application, the base station receives a second PMI corresponding to each first subband of the N first subbands and a first PMI corresponding to each second subband of the M second subbands that are fed back by the UE, and both N and M are integers not less than 2, so that the base station receives multiple first PMIs, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Additionally, M $W_1$s are in a one-to-one correspondence with M second subbands, so that each $W_1$ corresponds to a part in the system transmission bandwidth, and a bandwidth of each part in the system transmission bandwidth corresponds to a $W_1$, and M is an integer not less than 2. Therefore, multiple $W_1$s cover a beam phase change of the entire system transmission bandwidth, reducing a system performance loss; and because each $W_1$ corresponds to only one part in the system transmission bandwidth, quantization granularity precision of the beam vectors is improved.

Embodiment 17

Figure 6:
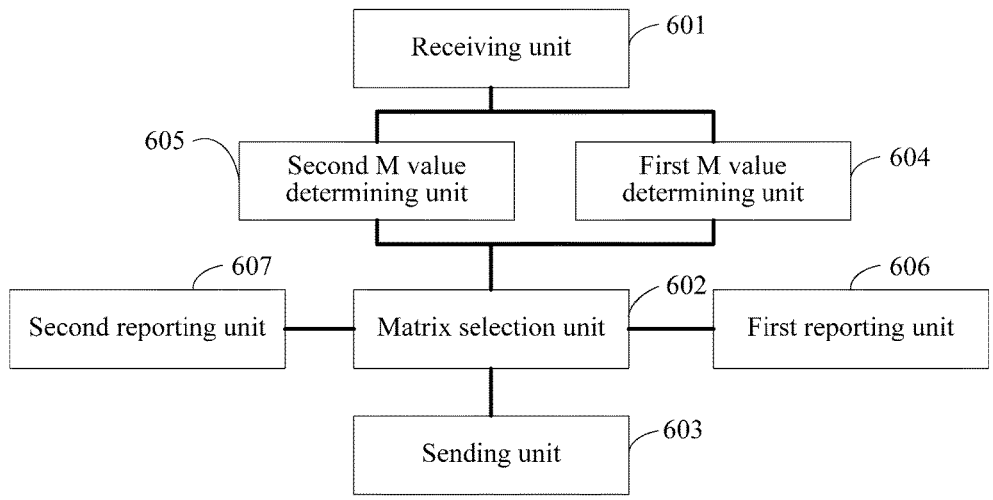
FIG. 6 is a first structural diagram of UE according to an embodiment of this application.

Based on a technical idea the same as that of the foregoing precoding matrix indicator feedback method, this embodiment of the present invention provides UE. As shown in FIG. 6, the UE includes:

a receiving unit 601, configured to receive a reference signal sent by a base station;

a matrix selection unit 602, configured to receive the reference signal sent by the receiving unit 601, and select, based on the reference signal, a precoding matrix for each first subband of N first subbands in a system transmission bandwidth from a codebook, where the codebook includes at least two precoding matrixes, and each precoding matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2; and a sending unit 603, configured to: after the matrix selection unit 602 selects a precoding matrix for each first subband, feed back the first PMI corresponding to each second subband to the base station, and feed back the second PMI corresponding to each first subband to the base station.

The reference signal received by the receiving unit 601 may include, for example, a CSI RS, a DM RS, or a CRS.

Preferably, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Preferably, before the matrix selection unit 602 selects a precoding matrix for each first subband of N first subbands in a system transmission bandwidth from a codebook, the UE further need to determine the M second subbands from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

Preferably, when the UE determines the M second subbands from the N first subbands, the UE first determines a value of M, and then determines the M second subbands from the N first subbands according to the value of M, where when determining the value of M, the UE may determine the value of M in a configuration manner of the UE, a feedback manner of the UE, a predefinition manner or a configuration manner of the base station, and after determining the value of M, the UE divides the N first subbands into the M second subbands. Moreover, because at least one second subband including at least two first subbands exists, the value of M is less than a value of N.

Preferably, when the UE determines the value of M in the feedback manner of the UE, the UE further includes a first M value determining unit 604, configured to report a pre-selected value of M to the base station, and receive a value of M fed back by the base station, where the value of M is determined by the base station based on the pre-selected value of M.

Specifically, the first M value determining unit 604 selects the pre-selected value of M, and then reports the pre-selected value of M to the base station, and after receiving the pre-selected value of M, the base station determines the value of M according to the pre-selected value of M, and the base station feeds back the determined value of M to the UE, and then receives the value of M.

Preferably, when the UE determines the value of M in the configuration manner of the UE, the UE further includes a second M value determining unit 605, configured to determine, based on the reference signal, a channel estimation, and then determine a value of M according to the channel estimation and the codebook, where a capacity gain between a system capacity obtained when the M second subbands are selected and a system capacity obtained when M−1 second subbands are selected is greater than a threshold.

Specifically, the second M value determining unit 605 is specifically configured to: when the value of M is determined according to the channel estimation and the codebook, determine the threshold according to an actual situation, and the value of M is not greater than a quantity of precoding matrixes in the codebook. For example, if the quantity of the precoding matrixes is 5, the value of M is 5 maximally, and 2 minimally.

Preferably, when the UE determines the M second subbands from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE may determine the quantity of the first subbands included in each second subband in the configuration manner of the UE, the feedback manner of the UE, the predefinition manner or the configuration manner of the base station, and after determining the quantity of the first subbands included in each second subband, the UE determines the M second subbands from the N first subbands.

Preferably, the UE further includes a first reporting unit 606, configured to: when the matrix selection unit 602 selects, based on the reference signal, a precoding matrix for each first subband of the N first subbands in the system transmission bandwidth from the codebook, report a value of M to the base station.

Preferably, the UE further includes a second reporting unit 607, configured to: when the matrix selection unit selects, based on the reference signal, the precoding matrix for each first subband of the N first subbands in the system transmission bandwidth from the codebook, report a quantity of first subbands included in each second subband of the M second subbands to the base station.

Preferably, a value of M and/or a quantity of first subbands included in each second subband of the M second subbands is configured by the base station.

Preferably, a value of M and/or a quantity of first subbands included in each second subband of the M second subbands is predefined.

Specifically, the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

Further, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

Preferably, there are at least two second subbands corresponding to different first PMIs in the M second subbands.

Preferably, the first subbands included in each second subband of the M second subbands are contiguous in frequency or non-contiguous in frequency.

Preferably, each precoding matrix in the codebook may be denoted as $$W = W_1 \cdot W_2$$

where $W_1$ is denoted by the first PMI, and $W_2$ is denoted by the second PMI.

Preferably, because the value of M is determined according to the channel estimation and the codebook, and when environments in which different UEs are located are different, corresponding channel characteristic parameters such as angular spread, a frequency correlation, and a spatial correlation are different, and/or the codebook differs, quantities of second subbands corresponding to different UEs may be the same or different, and values of M corresponding to at least two UEs may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 18

Figure 7:
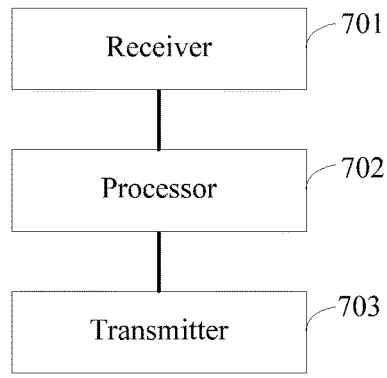
FIG. 7 is a second structural diagram of UE according to an embodiment of this application.

Based on a technical idea the same as that of the foregoing precoding matrix indicator feedback method, this embodiment of the present invention provides UE. As shown in FIG. 7, the UE includes:

a receiver 701, configured to receive a reference signal sent by a base station;

a processor 702, configured to select, based on the reference signal, a precoding matrix for each first subband of N first subbands in a system transmission bandwidth from a codebook, where the codebook includes at least two precoding matrixes, and each precoding, matrix is denoted by at least a first precoding matrix indicator PMI and a second PMI, where each first subband of the N first subbands corresponds to a second PMI, each second subband of M second subbands corresponds to a first PMI, the M second subbands are determined from the N first subbands, and there is at least one second subband including at least two first subbands in the M second subbands, where both N and M are positive integers not less than 2; and a transmitter 703, configured to feed back the first PMI corresponding to each second subband to the base station, and feed back the second PMI corresponding to each first subband to the base station.

The receiver 701 is, for example, an electronic device such as an antenna. Further, the processor 702 is, for example, an independent processing chip, and may further be a processor of the UE. Further, the transmitter 703 is, for example, an electronic device such as an antenna.

The reference signal received by the receiver 701 may include, for example, a CSI RS, a DM RS, or a CRS.

Preferably, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Preferably, before selecting a precoding matrix for each first subband of N first subbands in a system transmission bandwidth from a codebook, the processor 702 further needs to determine the M second subbands from the N first subbands, where all first subbands included in the M second subbands are the N first subbands, and each first subband can be included in only one second subband, where each second subband of the M second subbands corresponds to a first PMI, so that all first subbands included in a second subband including at least two first subbands correspond to a same first PMI.

Preferably, when the UE determines the M second subbands from the N first subbands, the UE first determines a value of M, and then determines the M second subbands from the N first subbands according to the value of M, where when determining the value of M, the UE may determine the value of M in a configuration manner of the UE, a feedback manner of the UE, a predefinition manner or a configuration manner of the base station, and after determining the value of M, the UE divides the N first subbands into the M second subbands. Moreover, because at least one second subband including at least two first subbands exists, the value of M is less than a value of N.

Preferably, when the UE determines the value of M in the feedback manner of the UE, the transmitter 703 is further configured to report a pre-selected value of M to the base station; and the receiver 701 is further configured to receive the value of M fed back by the base station, where the value of M is determined by the base station based on the pre-selected value of M.

Specifically, the processor 702 selects the pre-selected value of M, and then reports the pre-selected value of M to the base station by using the transmitter 703, and after receiving the pre-selected value of M, the base station determines the value of M according to the pre-selected value of M, the base station feeds back the determined value of M to the UE, and then the receiver 701 receives the value of M fed back by the base station.

Preferably, when the UE determines the value of M in the configuration manner of the UE, the processor 702 is specifically configured to determine, based on the reference signal, a channel estimation, and determine the value of M according to the channel estimation and the codebook, where a capacity gain between a system capacity obtained when the M second subbands are selected and a system capacity obtained when M−1 second subbands are selected is greater than a threshold.

Specifically, the processor 702 is specifically configured to: when the value of M is determined according to the channel estimation and the codebook, determine the threshold according to an actual situation, and the value of M is not greater than a quantity of precoding matrixes in the codebook. For example, if the quantity of the precoding matrixes is 5, the value of M is 5 maximally, and 2 minimally.

Preferably, when the UE determines the M second subbands from the N first subbands, the UE first determines a quantity of first subbands included in each second subband of the M second subbands, and then determines the M second subbands from the N first subbands according to the quantity of the first subbands included in each second subband, where when determining the quantity of the first subbands included in each second subband, the UE may determine the quantity of the first subbands included in each second subband in the configuration manner of the UE, the feedback manner of the UE, the predefinition manner or the configuration manner of the base station, and after determining the quantity of the first subbands included in each second subband, the UE determines the M second subbands from the N first subbands.

Preferably, the transmitter 703 is configured to: when the processor 702 selects, based on the reference signal, a precoding matrix for each first subband of the N first subbands in the system transmission bandwidth from the codebook, report the value of M to the base station.

Preferably, the transmitter 703 is configured to: when the processor 702 selects, based on the reference signal, a precoding matrix for each first subband of the N first subbands in the system transmission bandwidth from the codebook, report a quantity of first subbands included in each second subband of the M second subbands to the base station.

Preferably, a value of M and/or a quantity of first subbands included in each second subband of the M second subbands is configured by the base station.

Preferably, a value of M and/or a quantity of first subbands included in each second subband of the M second subbands is predefined.

Specifically, the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

Further, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

Preferably, there are at least two second subbands corresponding to different first PMIs in the M second subbands.

Preferably, the first subbands included in each second subband of the M second subbands are contiguous in frequency or non-contiguous in frequency.

Preferably, each precoding matrix in the codebook may be denoted as $$W = W_1 \cdot W_2$$

where $W_1$ is denoted by the first PMI, and $W_2$ is denoted by the second PMI.

Preferably, because the value of M is determined according to the channel estimation and the codebook, and when environments in which different UEs are located are different, corresponding channel characteristic parameters such as angular spread, a frequency correlation, and a spatial correlation are different, and/or, the codebook differs, quantities of second subbands corresponding to different UEs may be the same or different, and values of M corresponding to at least two UEs may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 19

Figure 8:
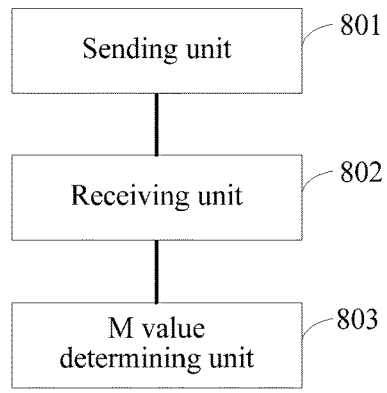
FIG. 8 is a first structural diagram of a base station according to an embodiment of this application.

Based on a technical idea the same as that of the foregoing precoding matrix indicator receiving method, this embodiment of the present invention provides a base station. As shown in FIG. 8, the base station includes:

a sending unit 801, configured to send a reference signal to UE; and a receiving unit 802, configured to receive a second PMI corresponding to each first subband of N first subbands and a first PMI corresponding to each second subband of M second subbands in a system transmission bandwidth that are fed back by the UE, where the M second subbands are determined from the N first subbands, there is at least one second subband including at least two first subbands in the M second subbands, and both N and M are positive integers not less than 2; and the base station has a codebook, where the codebook includes at least two precoding matrixes, and selects a corresponding precoding matrix from the codebook according to the first PMI corresponding to each second subband and the second PMI corresponding to each first subband.

The sending unit 801 may send downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Specifically, after the sending unit 801 sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the sending unit 801, so that the sending unit 802 can receive the first PMI corresponding to each second subband and the second PMI corresponding to each first subband, and then the base station searches the codebook for a corresponding precoding matrix according to the first PMI corresponding to each second subband and the second PMI corresponding to each first subband.

Preferably, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Preferably, the receiving unit 802 is further configured to receive a pre-selected value of M reported by the UE; and the base station further includes an M value determining unit 803, configured to receive the pre-selected value of M sent by the receiving unit 802, and determine a value of M according to the pre-selected value of M.

Preferably, a value of M and/or a quantity of first subbands included in each second subband of the M second subbands is configured by the base station.

Preferably, the receiving unit 802 is further configured to: after the base station sends the reference signal to the UE, receive a quantity of first subbands included in each second subband of the M second subbands, where the quantity is reported by the UE.

Preferably, the receiving unit 802 is further configured to: after the base station sends the reference signal to the UE, receive a value of M reported by the UE.

Preferably, a value of M and/or a quantity of first subbands included in each second subband of the M second subbands is predefined.

Specifically, the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

Further, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

Preferably, there are at least two second subbands corresponding to different first PMIs in the M second subbands.

Preferably, the first subbands included in each second subband of second subbands are contiguous in frequency or non-contiguous in frequency.

Preferably, each precoding matrix in the codebook may be denoted as $$W=W_1 \cdot W_2$$

where $W_1$ is denoted by the first PMI, and $W_2$ is denoted by the second PMI.

Preferably, because the value of M is determined according to the channel estimation and the codebook, and when environments in which different UEs are located are different, corresponding channel characteristic parameters such as angular spread, a frequency correlation, and a spatial correlation are different, and/or, the codebook differs, quantities of second subbands corresponding to different UEs may be the same or different, and values of M corresponding to at least two UEs may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

Embodiment 20

Figure 9:
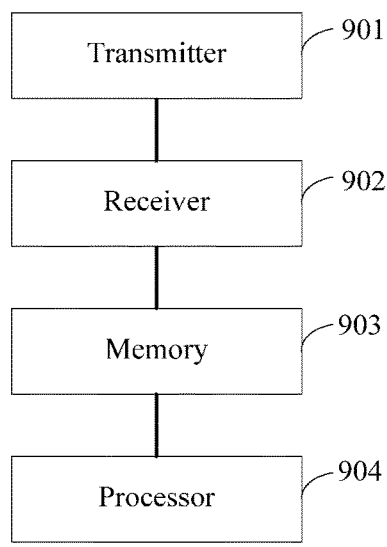
FIG. 9 is a second structural diagram of a base station according to an embodiment of this application.

Based on a technical idea the same as that of the foregoing precoding matrix indicator receiving method, this embodiment of the present invention provides a base station. As shown in FIG. 9, the base station includes:

a transmitter 901, configured to send a reference signal to UE; and a receiver 902, configured to receive a second PMI corresponding to each first subband of N first subbands and a first PMI corresponding to each second subband of M second subbands in a system transmission bandwidth that are fed back by the UE, where the M second subbands are determined the N first subbands, and there is at least one second subband including at least two first subbands in the M second subbands, where both N and M are positive integers not less than 2;

a memory 903, configured to store a codebook, where the codebook includes at least two precoding matrixes; and a processor 904, configured to select a corresponding precoding matrix from the codebook according to the first PMI corresponding to each second subband and the second PMI corresponding to each first subband.

The transmitter 901 is, for example, an electronic device such as an antenna. Further, the receiver 902 is, for example, an electronic device such as an antenna.

Further, the memory 903 is, for example, an electronic device such as a memory or a hard disk. Further, the processor 904 is, for example, an independent processing chip, or may further be a processor of the UE.

Preferably, the transmitter 901 may send downlink control information to the UE by using a physical downlink control channel, so that the UE can receive the downlink control information, and acquire the reference signal according to the downlink control information. Certainly, the base station may further send RRC signaling to the UE, where the RRC signaling includes the reference signal, so that the UE can acquire, based on the received RRC signaling, the reference signal.

Specifically, after the transmitter 901 sends the reference signal, the UE can receive the reference signal, then select, based on the reference signal, a precoding matrix for each first subband of the N first subbands from the codebook, where each precoding matrix in the codebook is denoted by at least a first PMI and a second PMI, and then feed back the first PMI corresponding to each second subband and the second PMI corresponding to each first subband to the transmitter 901, so that the transmitter 901 can receive the first PMI corresponding to each second subband and the second PMI corresponding to each first subband, and then the base station searches the codebook for a corresponding precoding matrix according to the first PMI corresponding to each second subband and the second PMI corresponding to each first subband.

Preferably, the N first subbands are all subbands or some subbands in the system transmission bandwidth, and the UE and the base station determine and obtain the N same first subbands based on a same manner, where bandwidths corresponding to the first subbands may be the same or different. For example, the UE may divide the system transmission bandwidth into N first subbands in an evenly equal division manner or an unequal division manner.

Preferably, the receiver 902 is further configured to receive a pre-selected value of M reported by the UE; and the processor 904 is further configured to determine the value of M according to the pre-selected value of M.

Preferably, a value of M and/or a quantity of first subbands included in each second subband of the M second subbands is configured by the base station.

Preferably, the receiver 902 is further configured to: after the transmitter 901 sends the reference signal to the UE, receive a value of M reported by the UE.

Preferably, the receiver 902 is further configured to: after the transmitter 901 sends the reference signal to the UE, receive a quantity of first subbands included in each second subband of the M second subbands, where the quantity is reported by the UE.

Preferably, a value of M and/or a quantity of first subbands included in each second subband of the M second subbands is predefined.

Specifically, the value of M is determined in a predefinition manner, and when the value of M is determined in the predefinition manner, the UE and the base station may preset the value of M to a same value, for example, may set the value of M to a value such as 3, 4, or 5; or the UE may further set the value of M according to the system transmission bandwidth, and when the system transmission bandwidth is not greater than 10 MHz, the value of M is, for example, a value such as 2, 3, or 4, or when the system transmission bandwidth is greater than 10 MHz, the value of M is, for example, a value such as 3, 4, or 5.

Further, when the quantity of the first subbands included in each second subband of the M second subbands is determined in the predefinition manner, both the UE and the base station configure the quantity of the first subbands included in each second subband of the M second subbands by using a predefinition rule, where the predefinition rule may be, for example, that quantities of first subbands included in all second subbands are the same, or different, or partially the same.

Preferably, there are at least two second subbands corresponding to different first PMIs in the M second subbands.

Preferably, the first subbands included in each second subband of the M second subbands are contiguous in frequency or non-contiguous in frequency.

Preferably, each precoding matrix in the codebook may be denoted as $$W = W_1 \cdot W_2$$

where $W_1$ is denoted by the first PMI, and $W_2$ is denoted by the second PMI.

Preferably, because the value of M is determined according to the channel estimation and the codebook, and when environments in which different UEs are located are different, corresponding channel characteristic parameters such as angular spread, a frequency correlation, and a spatial correlation are different, and/or, the codebook differs, quantities of second subbands corresponding to different UEs may be the same or different, and values of M corresponding to at least two UEs may be the same or different.

Further, system transmission bandwidths corresponding to different UEs may be the same or different, and the system transmission bandwidth may be divided into N first subbands in the evenly equal division manner or the unequal division manner; therefore, it may be determined that values of N corresponding to different UEs may be the same or different, and quantities of second subbands corresponding to different UEs may be the same or different. When values of N corresponding to two UEs are the same, and values of M corresponding to the two UEs are different, quantities of first subbands included in all second subbands of M second subbands corresponding to the two UEs are different; and when values of N corresponding to two UEs are the same, and values of M corresponding to the two UEs are the same, quantities of first subbands included in all second subbands of M second subbands corresponding to the two UEs may be the same. Therefore, each second subband of M second subbands corresponding to at least two UEs includes a different or same quantity of first subbands.

In this embodiment of the present invention, in technical solutions of this application, a precoding matrix is selected, based on a received reference signal sent by a base station, from a codebook, and a precoding matrix indicator PMI corresponding to the precoding matrix is sent to the base station; and M second subbands are determined from N first subbands, and a first PMI is fed back for each second subband, so that multiple first PMIs are fed back to the base station, and a first PMI corresponds to a beam phase change range. Therefore, in a scenario in which a beam phase change is relatively large, a beam phase change of an entire bandwidth may be covered by using multiple first precoding matrixes, while in a scenario in which a beam phase change is relatively small, a beam quantization granularity can be improved by using multiple first precoding matrixes, so that a codebook matches a scenario of a beam phase, and system performance is improved.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A user equipment UE, wherein the UE comprises:
a memory storing instructions; and
a processor to execute the instructions to configure the processor to implement:
 a receiving unit, configured to receive a reference signal sent by a base station;
 a matrix selection unit, configured to receive the reference signal sent by the receiving unit, and select, based on the reference signal, a precoding matrix for each first subband of N first subbands in a system transmission bandwidth from a codebook, wherein the codebook comprises at least two precoding matrixes, and each precoding matrix is denoted by at least a first precoding matrix indicator (PMI) and a second PMI, wherein each first subband is included in the N first subbands and in one of M second subbands, each first subband of the N first subbands corresponds to a second PMI, each second subband of the M second subbands corresponds to a first PMI, the M second subbands are determined from the N first subbands, and there is at least one second subset of subbands comprising at least two first subbands in the M second subbands, wherein both N and M are positive integers not less than 2; and
 a sending unit, configured to: after the matrix selection unit selects the precoding matrix for each first subband, feed back the first PMI corresponding to each second subband to the base station, and feed back the second PMI corresponding to each first subband to the base station.

2. The UE according to claim 1, wherein the the processor further executes the instructions to configure the processor to implement a first reporting unit, configured to: when the matrix selection unit selects, based on the reference signal, the precoding matrix for each first subband of the N first subbands in the system transmission bandwidth from the codebook, report a value of M to the base station.

3. The UE according to claim 1, wherein the processor further executes the instructions to configure the processor to implement a first M value determining unit, configured to report a pre-selected value of M to the base station, and receive a value of M fed back by the base station, wherein the value of M is determined by the base station based on the pre-selected value of M.

4. The UE according to claim 1, wherein the processor further executes the instructions to configure the processor to implement a second reporting unit, configured to: when the matrix selection unit selects, based on the reference signal, the precoding matrix for each first subband of the N first subbands in the system transmission bandwidth from the codebook, report a quantity of first subbands comprised in each second subband of the M second subbands to the base station.

5. The UE according to claim 1, wherein there are at least two second subbands corresponding to different first PMIs in the M second subbands.

6. The UE according to claim 1, wherein each precoding matrix in the codebook may be denoted as $$W = W_1 \cdot W_2$$

wherein $W_1$ is denoted by the first PMI, and $W_2$ is denoted by the second PMI.

7. A base station, wherein the base station comprises:
a memory storing instructions; and
a processor to execute the instructions to configure the processor to implement:
 a sending unit, configured to send a reference signal to a user equipment (UE); and
 a receiving unit, configured to receive a second PMI corresponding to each first subband of N first subbands and a first precoding matrix indicator (PMI) corresponding to each second subband of M second subbands in a system transmission bandwidth that are fed back by the UE, wherein each first subband is included in the N first subbands and in one of the M second subbands, the M second subbands are determined from the N first subbands, there is at least one second subset of subbands comprising at least two first subbands in the M second subbands, and both N and M are positive integers not less than 2; and the base station has a codebook, wherein the codebook comprises at least two precoding matrixes, and selects a corresponding precoding matrix from the codebook according to the first PMI corresponding to each second subband and the second PMI corresponding to each first subband.

8. The base station according to claim 7, wherein the receiving unit is further configured to: after the base station sends the reference signal to the UE, receive a value of M reported by the UE.

9. The base station according to claim 7, wherein the receiving unit is further configured to receive a pre-selected value of M reported by the UE; and the base station further comprises an M value determining unit, configured to receive the pre-selected value of M sent by the receiving unit, and determine a value of M according to the pre-selected value of M.

10. The base station according to claim 7, wherein the receiving unit is further configured to: after the base station sends the reference signal to the UE, receive a quantity of first subbands comprised in each second subband of the M second subbands, wherein the quantity is reported by the UE.

11. The base station according to claim 7, wherein there are at least two second subbands corresponding to different first PMIs in the M second subbands.

12. The base station according to claim 7, wherein each precoding matrix in the codebook may be denoted as $$W=W_1 \cdot W_2$$

wherein $W_1$ is denoted by the first PMI, and $W_2$ is denoted by the second PMI.

13. A precoding matrix indicator feedback method, wherein the method comprises:
receiving, by a user equipment UE, a reference signal sent by a base station;
selecting, by the UE based on the reference signal, a precoding matrix for each first subband of N first subbands in a system transmission bandwidth from a codebook, wherein the codebook comprises at least two precoding matrixes, and each precoding matrix is denoted by at least a first precoding matrix indicator (PMI) and a second PMI, wherein each first subband is included in the N first subbands and in one of M second subbands, each first subband of the N first subbands corresponds to a second PMI, each second subband of the M second subbands corresponds to a first PMI, the M second subbands are determined from the N first subbands, and there is at least one second subset of subbands comprising at least two first subbands in the M second subbands, wherein both N and M are positive integers not less than 2; and
feeding back, by the UE, the first PMI corresponding to each second subband to the base station, and feeding back the second PMI corresponding to each first subband to the base station.

14. The method according to claim 13, wherein when the selecting, by the UE based on the reference signal, a precoding matrix for each first subband of N first subbands in a system transmission bandwidth from a codebook, the method further comprises:
reporting, by the UE, a value of M to the base station.

15. The method according to claim 13, wherein a determining a value of M specifically comprises:
reporting, by the UE, a pre-selected value of M to the base station; and
receiving, by the UE, the value of M fed back by the base station, wherein the value of M is determined by the base station based on the pre-selected value of M.

16. The method according to claim 13, wherein each precoding matrix in the codebook may be denoted as $$W=W_1 \cdot W_2$$

wherein $W_1$ is denoted by the first PMI, and $W_2$ is denoted by the second PMI.

17. A precoding matrix indicator (PMI) receiving method, wherein the method comprises:
sending, by a base station, a reference signal to a user equipment (UE); and
receiving, by the base station, a second PMI corresponding to each first subband of N first subbands and a first PMI corresponding to each second subband of M second subbands in a system transmission bandwidth that are fed back by the UE, wherein each first subband is included in the N first subbands and in one of the M second subbands, the M second subbands are determined from the N first subbands, there is at least one second subset of subbands comprising at least two first subbands in the M second subbands, and both N and M are positive integers not less than 2; and the base station has a codebook, wherein the codebook comprises at least two precoding matrixes, and selects a corresponding precoding matrix from the codebook according to the first PMI corresponding to each second subband and the second PMI corresponding to each first subband.

18. The method according to claim 17, wherein after the sending, by a base station, a reference signal to UE, the method further comprises:
receiving, by the base station, a value of M reported by the UE.

19. The method according to claim 17, wherein a determining a value of M specifically comprises:
receiving, by the base station, a pre-selected value of M reported by the UE; and
determining, by the base station, the value of M according to the pre-selected value of M.

20. The method according to claim 17, wherein each precoding matrix in the codebook may be denoted as $$W=W_1 \cdot W_2$$

wherein $W_1$ is denoted by the first PMI, and $W_2$ is denoted by the second PMI.

21. A non-transitory computer-readable storage medium, comprising computer program codes when executed by a computer processor cause the compute processor to execute:
receiving a reference signal sent by a base station;
selecting, based on the reference signal, a precoding matrix for each first subband of N first subbands in a system transmission bandwidth from a codebook, wherein the codebook comprises at least two precoding matrixes, and each precoding matrix is denoted by at least a first precoding matrix indicator (PMI) and a second PMI, wherein each first subband is included in the N first subbands and in one of M second subbands, each first subband of the N first subbands corresponds to a second PMI, each second subband of the M second subbands corresponds to a first PMI, the M second subbands are determined from the N first subbands, and there is at least one second subset of subbands comprising at least two first subbands in the M second subbands, wherein both N and M are positive integers not less than 2; and feeding back the first PMI corresponding to each second subband to the base station, and feeding back the second PMI corresponding to each first subband to the base station.

* * * * *